United States Patent
Kawana et al.

(10) Patent No.: US 11,294,158 B2
(45) Date of Patent: Apr. 5, 2022

(54) ZOOM LENS AND IMAGING APPARATUS

(71) Applicant: FUJIFILM Corporation, Tokyo (JP)

(72) Inventors: Masanao Kawana, Saitama (JP); Yasutaka Shimada, Saitama (JP); Takuya Tanaka, Saitama (JP); Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 173 days.

(21) Appl. No.: 16/828,641

(22) Filed: Mar. 24, 2020

(65) Prior Publication Data
US 2020/0310091 A1    Oct. 1, 2020

(30) Foreign Application Priority Data

Mar. 26, 2019    (JP) .............................. JP2019-059477

(51) Int. Cl.
| | | |
|---|---|---|
| *G02B 15/177* | (2006.01) | |
| *G02B 15/20* | (2006.01) | |
| *G02B 9/60* | (2006.01) | |
| *G02B 13/00* | (2006.01) | |
| *H04N 5/225* | (2006.01) | |
| *G02B 27/00* | (2006.01) | |
| *H04N 5/232* | (2006.01) | |

(52) U.S. Cl.
CPC ............. *G02B 15/177* (2013.01); *G02B 9/60* (2013.01); *G02B 13/009* (2013.01); *G02B 15/20* (2013.01); *G02B 27/0025* (2013.01); *H04N 5/2254* (2013.01); *H04N 5/23296* (2013.01)

(58) Field of Classification Search
CPC ...... G02B 15/177; G02B 9/60; G02B 13/009; G02B 15/20; G02B 27/0025; H04N 5/2254; H04N 5/23296

USPC .......................................................... 359/680
See application file for complete search history.

(56) References Cited

U.S. PATENT DOCUMENTS

2005/0128604 A1\* 6/2005 Kuba ............. G02B 15/145129
                                                         359/726
2013/0301141 A1   11/2013 Ryu
(Continued)

FOREIGN PATENT DOCUMENTS

| | | |
|---|---|---|
| JP | 2009-128491 A | 6/2009 |
| JP | 2015-230449 A | 12/2015 |

(Continued)

OTHER PUBLICATIONS

An Office Action mailed by the Japanese Patent Office dated Feb. 1, 2022, which corresponds to Japanese Patent Application No. 2019-059477 and is related to U.S. Appl. No. 16/828,641; with English language translation.

*Primary Examiner* — James R Greece
(74) *Attorney, Agent, or Firm* — Studebaker & Brackett PC

(57) ABSTRACT

The zoom lens consists of, in order from an object side, a positive first lens group, a negative second lens group, a positive third lens group, a positive fourth lens group, and a positive fifth lens group. During zooming, the second lens group, the third lens group, and the fourth lens group move. The first lens group consists of, in order from an object side, a negative first a lens group, a positive first b lens group that moves during focusing, and a positive first c lens group. The second lens group includes one positive lens and one or more negative lenses successively in order from a most object side to an image side.

13 Claims, 12 Drawing Sheets

(56) References Cited

U.S. PATENT DOCUMENTS

2015/0241673 A1* 8/2015 Nagatoshi ...... G02B 15/145119
  359/683
2019/0025557 A1  1/2019 Ota et al.

FOREIGN PATENT DOCUMENTS

| JP | 2016-075828 A | 5/2016 |
| JP | 2018-072581 A | 5/2018 |
| WO | 2017/170047 A1 | 10/2017 |

* cited by examiner

EXAMPLE 1

EXAMPLE 1

EXAMPLE 2

EXAMPLE 3

EXAMPLE 4

EXAMPLE 5

ZOOM LENS AND IMAGING APPARATUS

CROSS-REFERENCE TO RELATED APPLICATIONS

The present application claims priority under 35 U.S.C. § 119 to Japanese Patent Application No. 2019-059477, filed on Mar. 26, 2019. The above application is hereby expressly incorporated by reference, in its entirety, into the present application.

BACKGROUND OF THE INVENTION

1. Field of the Invention

The present disclosure relates to a zoom lens and an imaging apparatus.

2. Description of the Related Art

In the related art, a five-group lens system is known as a zoom lens used in a broadcast camera, a movie camera, a digital camera, and the like. For example, JP2015-230449A discloses a zoom lens which comprises, in order from an object side to an image side, a first lens group having a positive refractive power, a second lens group having a negative refractive power, a third lens group, a fourth lens group, and a fifth lens group having a positive refractive power, and in which the second lens group, the third lens group, and the fourth lens group move during zooming.

SUMMARY OF THE INVENTION

In recent years, a camera with a larger sensor size than the related art has been used in order to obtain a high image quality, and there is a need for a lens system having a large image circle for corresponding with such a camera. In addition, there is an increasing demand for image definition, and the lens system is required to have optical performance for corresponding with a pixel pitch equal to or less than the related art even in a case where the sensor size increases. On the other hand, in consideration of operation at an imaging site, there is a demand for avoiding a significant increase in size compared to a lens system that has been used in the related art.

The five-group lens system described in JP2015-230449A has a large lateral chromatic aberration and a small image circle. In a case where the five-group lens system described in JP2015-230449A is proportionally enlarged and thus realizes favorable optical performance so as to correspond with an image circle having a size desired in recent years, the overall length of the lens system becomes long.

The present disclosure has been made in view of the above circumstances, and an object thereof is to provide a zoom lens having a large image circle and favorable optical performance while suppressing a size of the entire system, and an imaging apparatus comprising the zoom lens.

A zoom lens according to an aspect of the present disclosure consists of, in order from an object side to an image side: a first lens group that has a positive refractive power; a second lens group that has a negative refractive power; a third lens group that has a positive refractive power; a fourth lens group that has a positive refractive power; and a fifth lens group that has a positive refractive power, wherein during zooming from a wide-angle end to a telephoto end, the first lens group and the fifth lens group remain stationary with respect to an image plane, the second lens group moves to an image side, and the third lens group and the fourth lens group move along an optical axis while changing a distance with each of adjacent lens groups, wherein the first lens group consists of, in order from an object side to an image side, a first a lens group that remains stationary with respect to an image plane during focusing and has a negative refractive power, a first b lens group that moves along an optical axis during focusing and has a positive refractive power, and a first c lens group that remains stationary with respect to an image plane during focusing and has a positive refractive power, and wherein the second lens group includes one positive lens and one or more negative lenses successively in order from a most object side to an image side.

Among the negative lenses included in the second lens group of the zoom lens of the above described aspect, for the negative lens having a largest Abbe number based on a d line, assuming that an Abbe number based on a d line is νn and a partial dispersion ratio between a g line and an F line is θn, it is preferable that the following Conditional Expression (1) is satisfied, it is more preferable that the following Conditional Expression (1-1) is satisfied, and it is still more preferable that the following Conditional Expression (1-2) is satisfied.

$$0.01 < \theta n - (0.6483 - 0.001802 \times vn) < 0.08 \quad (1)$$

$$0.02 < \theta n - (0.6483 - 0.001802 \times vn) < 0.07 \quad (1\text{-}1)$$

$$0.03 < \theta n - (0.6483 - 0.001802 \times vn) < 0.07 \quad (1\text{-}2)$$

It is preferable that among the negative lenses included in the second lens group of the zoom lens of the above described aspect, the negative lens having a largest Abbe number based on a d line is disposed on an image side of the positive lens to be successive to the positive lens.

In the zoom lens of the above described aspect, it is preferable that the positive lens and the negative lens disposed on an image side of the positive lens to be successive to the positive lens are cemented with each other to form a cemented lens.

In a case where the zoom lens of the above described aspect has the cemented lens, assuming that an Abbe number of the positive lens of the cemented lens based on a d line of is νp1, a partial dispersion ratio between a g line and an F line of the positive lens of the cemented lens is θp1, an Abbe number of the negative lens of the cemented lens based on a d line is νn1, and a partial dispersion ratio between a g line and an F line of the negative lens of the cemented lens is θn1, it is preferable that the following Conditional Expressions (2) and (3) are satisfied. Further, in addition to satisfying Conditional Expressions (2) and (3), it is more preferable that at least one of the following Conditional Expression (2-1) or (3-1) is satisfied.

$$35 < vn1 - vp1 < 70 \quad (2)$$

$$-0.09 < \theta n1 - \theta p1 < -0.03 \quad (3)$$

$$45 < vn1 - vp1 < 70 \quad (2\text{-}1)$$

$$-0.08 < \theta n1 - \theta p1 < -0.04 \quad (3\text{-}1)$$

In the zoom lens of the above described aspect, assuming that a focal length of the second lens group is f2 and a focal length of the positive lens is fp1, it is preferable to satisfy the following Conditional Expression (4), and it is more preferable to satisfy the Conditional Expression (4-1).

$$0.3 < |f2/fp1| < 0.65 \quad (4)$$

$$0.4 < |f2/fp1| < 0.65 \quad (4\text{-}1)$$

It is preferable that the second lens group of the zoom lens of the above described aspect consists of two or more positive lenses and three or more negative lenses.

An imaging apparatus according to another aspect of the present disclosure comprises the zoom lens of the above described aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the term "~ group having a negative refractive power" means that the group has a negative refractive power as a whole. The term "a lens having a positive refractive power" and the term "a positive lens" are synonymous. The term "a lens having a negative refractive power" and the term "a negative lens" are synonymous. The "lens group" is not limited to a configuration using a plurality of lenses, and may consist of only one lens.

The sign of the refractive power and the surface shape of a lens including an aspheric surface are considered in terms of the paraxial region unless otherwise noted. A compound aspheric lens (a lens which is integrally composed of a spherical lens and a film having an aspheric shape formed on the spherical lens, and functions as one aspheric lens as a whole) is not considered as a cemented lens, and is treated as a single lens.

The "focal length" used in a conditional expression is a paraxial focal length. The value used in a conditional expression is a value in the case of using a d line as a reference in a state of being focused on an object at infinity, in addition to a partial dispersion ratio. Assuming that refractive indexes of a lens with respect to a g line, an F line, and a C line are Ng, NF, and NC, respectively, a partial dispersion ratio $\theta gF$ between the g line and the F line of the lens is defined as $\theta gF=(Ng-NF)/(NF-NC)$. The "d line", "C line", "F line", and "g line" described in this specification are bright lines, the wavelength of the d line is 587.56 nm (nanometers), the wavelength of the C line is 656.27 nm (nanometers), the wavelength of the F line is 486.13 nm (nanometers), and the wavelength of the g line is 435.84 nm (nanometers).

According to the present disclosure, it is possible to provide a zoom lens having a large image circle and favorable optical performance while suppressing a size of the entire system, and an imaging apparatus comprising the zoom lens.

DESCRIPTION OF THE PREFERRED EMBODIMENTS

Figure 1:
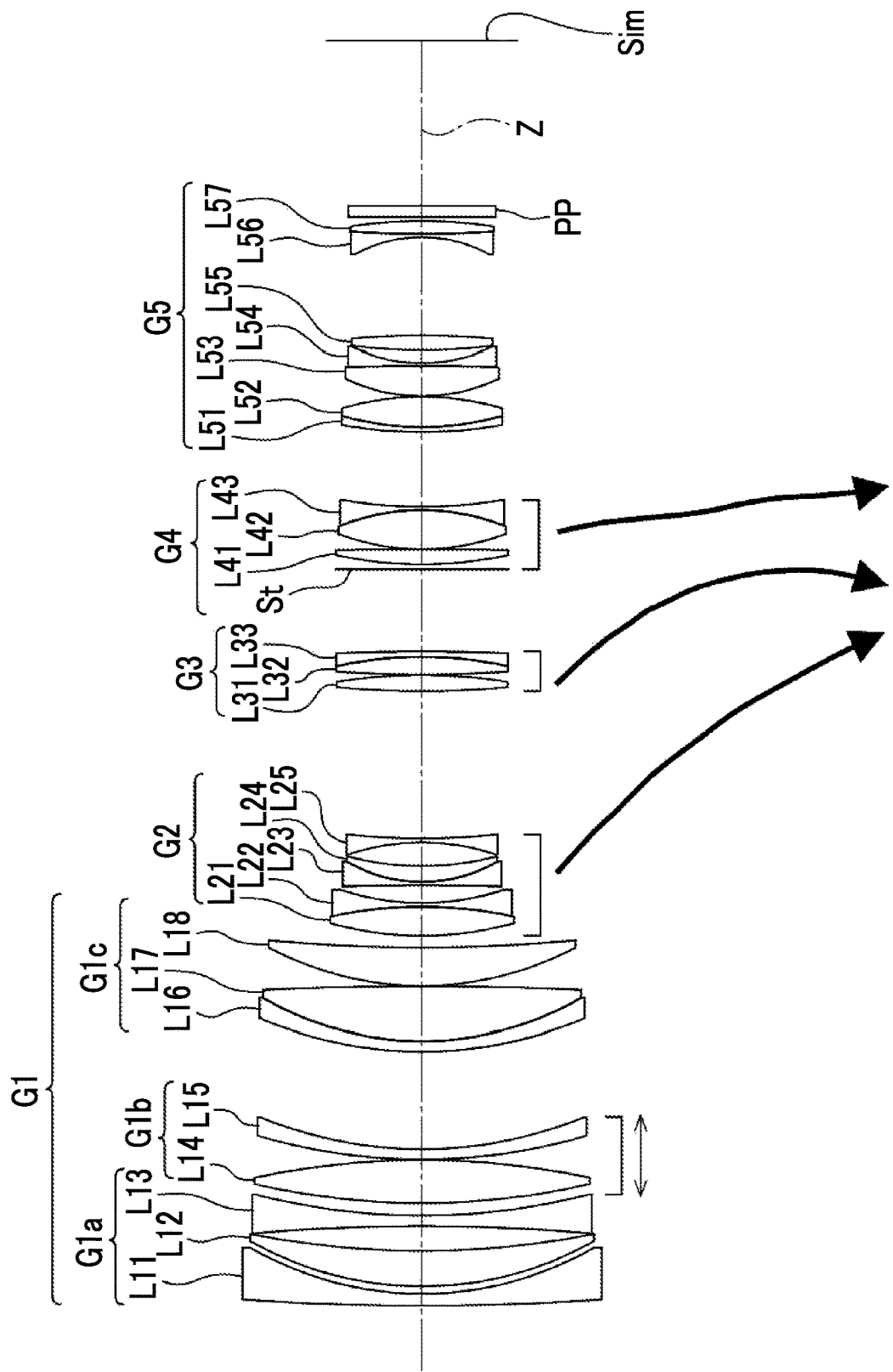
FIG. 1 is a diagram showing a cross-sectional view of a configuration of a zoom lens according to an embodiment of the present disclosure and a movement locus thereof, corresponding to a zoom lens of Example 1 of the present disclosure.
Figure 2:
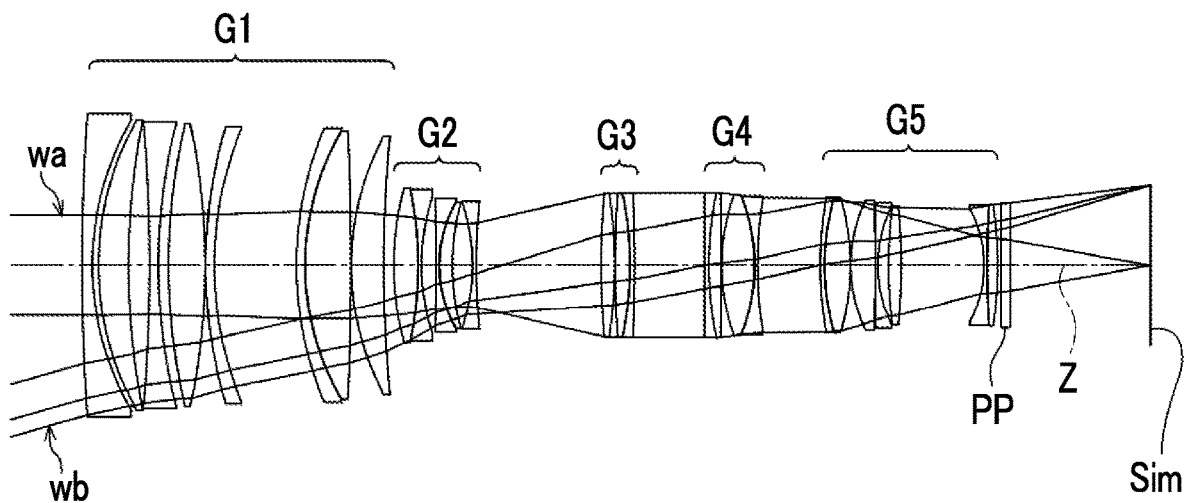
FIG. 2 is a cross-sectional view showing configurations and rays of the zoom lens shown in FIG. 1 in each zoom state.
Figure 2:
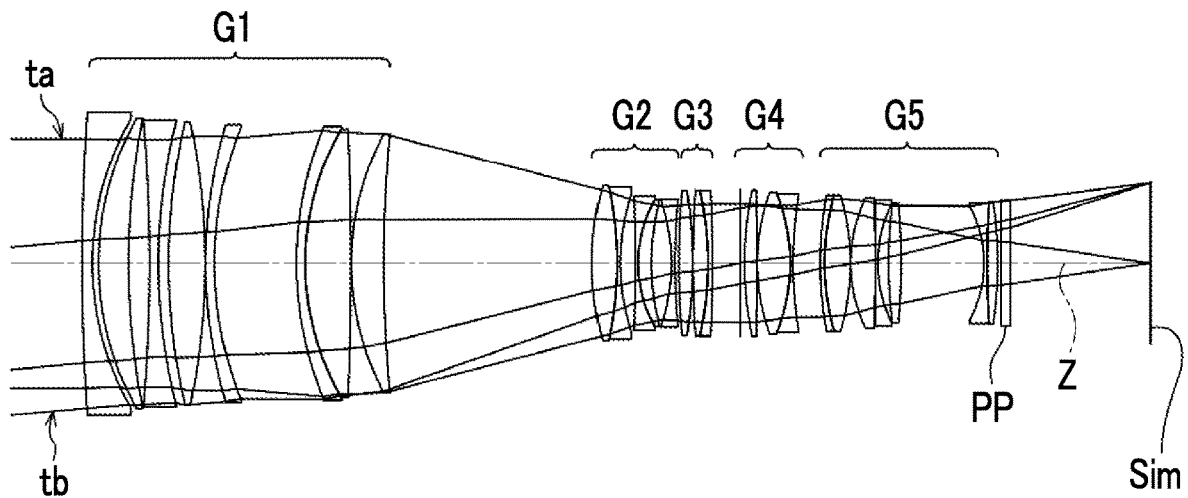

Hereinafter, embodiments of a zoom lens of the present disclosure will be described in detail with reference to the drawings. FIG. 1 is a diagram showing a cross-sectional view of a configuration and a movement locus of a zoom lens according to an embodiment of the present disclosure at a wide-angle end. FIG. 2 is a cross-sectional view showing configurations and rays of the zoom lens in each zoom state. The example shown in FIGS. 1 and 2 correspond to a zoom lens of Example 1 to be described later. FIGS. 1 and 2 show states of being focused on an object at infinity, a left side thereof is an object side, and a right side thereof is an image side. In FIG. 2, an upper part labeled by "WIDE" shows a wide-angle end state, and a lower part labeled by "TELE" shows a telephoto end state. FIG. 2 shows rays including on-axis rays wa and rays with the maximum angle of view wb in a wide-angle end state, and on-axis rays to and rays with the maximum angle of view tb in a telephoto end state. Hereinafter, description will be given mainly with reference to FIG. 1.

FIG. 1 shows an example in which, assuming that a zoom lens is applied to an imaging apparatus, an optical member PP having a parallel plate shape is disposed between the zoom lens and an image plane Sim. The optical member PP is a member assumed to include various filters, a cover glass, and/or the like. The various filters include, for example, a low pass filter, an infrared cut filter, a filter that cuts a specific wavelength region, and the like. The optical member PP has no refractive power, and in the present disclosure, the optical member PP may be omitted.

The zoom lens of the present disclosure consists of, in order from an object side to an image side along an optical axis Z, a first lens group G1 that has a positive refractive power, a second lens group G2 that has a negative refractive power, a third lens group G3 that has a positive refractive power, a fourth lens group G4 that has a positive refractive power, and a fifth lens group G5 that has a positive refractive power. By configuring a most-object-side first lens group G1 with a positive lens group, an overall length of a lens system can be shortened, which is advantageous for downsizing. In addition, by configuring a most-image-side fifth lens group G5 with a positive lens group, it is possible to suppress an increase in an incidence angle of a principal ray of an off-axis ray to an image plane Sim, thereby to suppress shading.

In the example shown in FIG. 1, the first lens group G1 consists of eight lenses L11 to L18 in order from an object side to an image side, the second lens group G2 consists of five lenses L21 to L25 in order from an object side to an image side, the third lens group G3 consists of three lenses L31 to L33 in order from an object side to an image side, the fourth lens group G4 consists of an aperture stop St and three lenses L41 to L43 in order from an object side to an image side, and the fifth lens group G5 consists of seven lenses L51 and L57 in order from an object side to an image side. Meanwhile, in the zoom lens of the present disclosure, the number of lenses composing each lens group may be different from the number in the example shown in FIG. 1. In addition, the aperture stop St shown in FIG. 1 does not show its shape, but shows its position in a direction of an optical axis.

In the zoom lens of the present disclosure, it is configured such that during zooming from a wide-angle end to a telephoto end, the first lens group G1 and the fifth lens group G5 remain stationary with respect to an image plane Sim, the second lens group G2 always moves to an image side, and the third lens group G3 and the fourth lens group G4 move along an optical axis Z while changing a distance with each of adjacent lens groups. In FIG. 1, under the second lens group G2, the third lens group G3, and the fourth lens group G4, movement loci of the respective lens groups during zooming from a wide-angle end to a telephoto end are schematically indicated by arrows. It is possible that main zooming is performed by moving the second lens group G2 having a negative refractive power, and fluctuation in an image plane position due to zooming is corrected by moving the third lens group G3 and the fourth lens group G4. Since the third lens group G3 and the fourth lens group G4 move relatively during zooming, it is easy to favorably suppress fluctuation in a field curvature during zooming and fluctuation in a spherical aberration during zooming. In addition, the first lens group G1 and the fifth lens group G5 are configured to remain stationary during zooming. In such a configuration, a distance from a most-object-side lens surface to a most-image-side lens surface does not change during zooming, and it is possible to reduce fluctuation in barycenter of a lens system. Thus, it is possible to improve the convenience at the time of imaging.

The first lens group G1 consists of, in order from an object side to an image side, a first a lens group G1a that remains stationary with respect to an image plane Sim during focusing and has a negative refractive power, a first b lens group G1b that moves along an optical axis Z during focusing and has a positive refractive power, and a first c lens group G1c that remains stationary with respect to an image plane Sim during focusing and has a positive refractive power. With such a configuration, it is easy to reduce a spherical aberration and an on-axis chromatic aberration that occur during focusing. A horizontal double-headed arrow noted below the first b lens group G1b in FIG. 1 indicates that the first b lens group G1b is a focus lens group that moves during focusing.

It is preferable that the first b lens group G1b consists of, in order from an object side to an image side, a positive lens having a convex surface facing an object side and a negative meniscus lens having a convex surface facing an object side. In such a case, it is easy to suppress fluctuation in an off-axis aberration during focusing.

As an example, in the example shown in FIG. 1, the first a lens group G1a consists of three lenses L11 to L13 in order from an object side to an image side, the first b lens group G1b consists of two lenses L14 and L15 in order from an object side to an image side, and the first c lens group G1c consists of three lenses L16 to L18 in order from an object side to an image side. Meanwhile, in the zoom lens of the present disclosure, the number of lenses composing each lens group may be different from the number in the example shown in FIG. 1.

The second lens group G2 is configured to include one positive lens and one or more negative lenses successively in order from a most object side to an image side. By disposing the positive lens on a most object side of the second lens group G2, the height of an off-axis ray in the second lens group G2 can be reduced and the occurrence of lateral chromatic aberration can be suppressed. By disposing the negative lenses to be successive to a most-object-side positive lens of the second lens group G2, it is advantageous for correcting the lateral chromatic aberration.

Assuming that among the negative lenses included in the second lens group G2, for a negative lens having a largest Abbe number based on a d line, an Abbe number based on a d line is νn and a partial dispersion ratio between a g line and an F line is θn, it is preferable that the following Conditional Expression (1) is satisfied. By not allowing the result of Conditional Expression (1) to be equal to or less than a lower limit, it is advantageous for correcting a secondary chromatic aberration. By not allowing the result of Conditional Expression (1) to be equal to or more than an upper limit, it is possible to select a material having an appropriate Abbe number and it is easy to correct a primary chromatic aberration. Further, in a case of a configuration in which the following Conditional Expression (1-1) is satisfied, it is possible to obtain more favorable characteristics, and in a case of a configuration in which the following Conditional Expression (1-2) is satisfied, it is possible to obtain still more favorable characteristics.

$$0.01 < \theta n - (0.6483 - 0.001802 \times \nu n) < 0.08 \qquad (1)$$

$$0.02 < \theta n - (0.6483 - 0.001802 \times \nu n) < 0.07 \qquad (1\text{-}1)$$

$$0.03 < \theta n - (0.6483 - 0.001802 \times \nu n) < 0.07 \qquad (1\text{-}2)$$

It is preferable that among the negative lenses included in the second lens group G2, a negative lens having a largest Abbe number based on a d line is disposed on an image side of a most-object-side positive lens of the second lens group G2 to be successive to the positive lens. That is, it is preferable that among the negative lenses included in the second lens group G2, a negative lens having a largest Abbe number based on a d line is disposed on a most object side among the negative lenses of the second lens group G2. In such a case, it is easy to suppress the occurrence of a lateral chromatic aberration on the wide angle side.

It is preferable that the most-object-side positive lens of the second lens group G2 and the negative lenses disposed on an image side of the positive lens to be successive to the positive lens are cemented with each other to form a cemented lens. By disposing the cemented lens formed by cementing the positive lens and the negative lens in order from an object side on a most object side of the second lens group G2, it is easy to favorably correct a lateral chromatic aberration while suppressing a thickness of the second lens group G2 on the optical axis.

In a configuration in which the cemented lens is disposed on a most object side of the second lens group G2, assuming that an Abbe number of the positive lens of the cemented lens based on a d line of is νp1, a partial dispersion ratio between a g line and an F line of the positive lens of the cemented lens is θp1, an Abbe number of the negative lens of the cemented lens based on a d line is νn1, and a partial dispersion ratio between a g line and an F line of the negative lens of the cemented lens is θn1, it is preferable that the following Conditional Expressions (2) and (3) are satisfied. By satisfying both Conditional Expressions (2) and (3), it is easy to favorably correct a primary chromatic aberration and a secondary chromatic aberration on a telephoto side. Further, in addition to satisfying Conditional Expressions (2) and (3), in a case of a configuration in which at least one of the following Conditional Expression (2-1) or (3-1) is satisfied, it is possible to obtain more favorable characteristics.

$$35 < \nu n1 - \nu p1 < 70 \qquad (2)$$

$$-0.09 < \theta n1 - \theta p1 < -0.03 \qquad (3)$$

$$45 < \nu n1 - \nu p1 < 70 \qquad (2\text{-}1)$$

$$-0.08 < \theta n1 - \theta p1 < -0.04 \qquad (3\text{-}1)$$

In addition, assuming that a focal length of the second lens group G2 is f2 and a focal length of a most-object-side positive lens of the second lens group G2 is fp1, it is preferable that the following Conditional Expression (4) is satisfied. By not allowing the result of Conditional Expression (4) to be equal to or less than a lower limit, a height of an off-axis ray in the second lens group G2 is not increased, and thus it is easy to reduce a lateral chromatic aberration. By not allowing the result of Conditional Expression (4) to be equal to or more than an upper limit, a refractive power of a most-object-side positive lens of the second lens group G2 is allowed to be prevented from becoming excessively strong. As a result, it is easy to correct various aberrations. In addition, in a case of a configuration in which the following Conditional Expression (4-1) is satisfied, it is possible to obtain more favorable characteristics.

$$0.3 < |f2/fp1| < 0.65 \qquad (4)$$

$$0.4 < |f2/fp1| < 0.65 \qquad (4\text{-}1)$$

The second lens group G2 may be configured to consist of two or more positive lenses and three or more negative lenses. In such a case, by dividing a negative refractive power of the second lens group G2 into a plurality of lenses, it is possible to suppress the occurrence of an aberration, to correct a chromatic aberration occurred in each negative lens by the positive lens, and to suppress aberration fluctuation during zooming.

For example, the second lens group G2 can be configured to consist of, in order from an object side, a first cemented lens in which a positive lens and a negative lens are cemented in order from an object side, a second cemented lens in which a negative lens and a positive lens are cemented in order from an object side, and a negative lens. As an example, in the example shown in FIG. 1, the first cemented lens consists of a biconvex lens and a biconcave lens, the second cemented lens consists of a negative lens having a concave surface facing an image side and a positive meniscus lens having a convex surface facing an object side, and a most-image-side negative lens of the second lens group consists of a biconcave lens.

In addition, in the example shown in FIG. 1, the aperture stop St is disposed in the fourth lens group G4, and a distance between the fourth lens group G4 and the fifth lens group G5 at a wide-angle end is longer than a distance between the fourth lens group G4 and the fifth lens group G5 at a telephoto end. With such a configuration, it is possible to position a position of the aperture stop St at a wide-angle end closer to the object side than a position of the aperture stop St at a telephoto end, and thus it is possible to position an entrance pupil position at a wide-angle end closer to an object side than an entrance pupil position at a telephoto end. Accordingly, it is easy to suppress increase in an outer diameter of the first lens group G1 while inhibiting an overall length of the lens system from becoming long.

The above-mentioned preferred configurations and available configurations may be optional combinations, and it is preferable to selectively adopt the configurations in accordance with required specification. According to technology of the present disclosure, it is possible to realize a zoom lens having a large image circle and favorable optical performance while suppressing a size of the entire system. Further, "an image circle is large" means that a diameter of an image circle is larger than 43.2.

Next, numerical examples of the zoom lens of the present disclosure will be described.

Example 1

FIG. 1 shows a configuration and movement locus of a zoom lens of Example 1, and an illustration method and a configuration thereof are as described above. Therefore, repeated description is partially omitted herein. The zoom lens of Example 1 consists of, in order from an object side to an image side, a first lens group G1 that has a positive refractive power, a second lens group G2 that has a negative refractive power, a third lens group G3 that has a positive refractive power, a fourth lens group G4 that has a positive refractive power, and a fifth lens group G5 that has a positive refractive power. During zooming, the first lens group G1 and the fifth lens group G5 remain stationary with respect to an image plane Sim, and the second lens group G2, the third lens group G3, and the fourth lens group G4 move along an optical axis Z while changing a distance with each of adjacent lens groups. The first lens group G1 consists of, in order from an object side to an image side, a first a lens group G1a having a negative refractive power, a first b lens group G1b having a positive refractive power, and a first c lens group G1c having a positive refractive power. During focusing, only the first b lens group G1b moves along an optical axis Z, and all other lens groups remain stationary with respect to an image plane Sim. The first a lens group G1a consists of three lenses L11 to L13 in order from an object side to an image side, the first b lens group G1b consists of two lenses L14 and L15 in order from an object side to an image side, the first c lens group G1c consists of three lenses L16 to L18 in order from an object side to an image side, the second lens group G2 consists of five lenses L21 to L25 in order from an object side to an image side, the third lens group G3 consists of three lenses L31 to L33 in order from an object side to an image side, the fourth lens group G4 consists of an aperture stop St and three lenses L41 to L43 in order from an object side to an image side, and the fifth lens group G5 consists of seven lenses L51 and L57 in order from an object side to an image side. An outline of the zoom lens of Example 1 has been described above.

Regarding the zoom lens of Example 1, Tables 1A and 1B show basic lens data thereof, Table 2 shows specification and variable surface distances thereof, and Table 3 shows aspheric coefficients thereof. Here, the basic lens data is displayed to be divided into two tables of Table 1A and Table 1B in order to prevent one table from becoming long. Table 1A shows the first lens group G1, the second lens group G2, and the third lens group G3, and Table 1B shows the fourth lens group G4, the fifth lens group G5, and the optical member PP. Tables 1A, 1B, and 2 show data in a state of being focused on an object at infinity.

In Tables 1A and 1B, the column of Sn shows a surface number. A most-object-side surface is the first surface, and the surface numbers increase one by one toward an image side. The column of R shows radii of curvature of the respective surfaces. The column of D shows surface distances on an optical axis between the respective surfaces and the surfaces adjacent to an image side. The column of Nd shows a refractive index of each constituent element with respect to the d line, the column of νd shows an Abbe number of each constituent element based on the d line, and the column of θgF shows a partial dispersion ratio between the g line and the F line of each constituent element.

In Tables 1A and 1B, a sign of a radius of curvature of a surface having a convex surface facing an object side is positive and a sign of a radius of curvature of a surface having a convex surface facing an image side is negative. Table 1B also shows the aperture stop St and the optical member PP. In Table 1B, in the column of a surface number of a surface corresponding to the aperture stop St, the surface number and a term of (St) are noted. In Tables 1A and 1B, the variable surface distances during zooming are referenced by reference signs DD[ ], and are written into columns of D, where object side surface numbers of distances are noted in [ ].

In Table 2, values of a zoom ratio Zr, a focal length f, an F number FNo., a maximum total angle of view 2ω, a maximum image height IH, and a variable surface distance during zooming are shown based on the d line. (°) in the column of 2ω indicates that a unit thereof is a degree. In Table 2, values in a wide-angle end state and a telephoto end state are respectively shown in the columns labeled by WIDE and TELE.

In the basic lens data, a surface number of an aspheric surface is marked with *, and the numerical value of a paraxial radius of curvature is described in the column of a radius of curvature of the aspheric surface. In Table 3, a surface number of an aspheric surface is shown in the column of Sn, and the numerical value of the aspheric coefficient for each aspheric surface is shown in the columns of KA and Am (m is an integer of 3 or more and varies depending on the surface). The numerical value "E±n" (n: integer) of the aspheric coefficient in Table 3 means "×10$^{±n}$". KA and Am are aspheric coefficients in an aspheric expression represented by the following expression.

$$Zd = C \times h^2 / \{1 + (1 - KA \times C^2 \times h^2)^{1/2}\} + \Sigma Am \times h^m$$

Where,
Zd: aspheric depth (a length of a perpendicular line drawn from a point on an aspheric surface of a height h to a plane perpendicular to an optical axis in contact with an aspheric vertex)
h: height (a distance from an optical axis to a lens surface)
C: reciprocal of paraxial radius of curvature
KA, Am: aspheric coefficient, and
Σ in the aspheric expression means the sum of m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | νd | θgF |
|---|---|---|---|---|---|
| 1 | 635.85687 | 2.900 | 1.48749 | 70.24 | 0.53007 |
| 2 | 84.82438 | 1.793 | | | |
| *3 | 87.86309 | 8.493 | 1.85000 | 27.03 | 0.60935 |
| 4 | 216.23584 | 5.966 | | | |
| 5 | −483.34168 | 2.500 | 1.90265 | 35.77 | 0.58156 |
| 6 | 165.52407 | 2.946 | | | |
| 7 | 180.38340 | 10.407 | 1.53775 | 74.70 | 0.53936 |
| 8 | −198.00903 | 0.120 | | | |
| 9 | 143.26123 | 2.460 | 1.80518 | 25.46 | 0.61572 |
| 10 | 104.68399 | 23.548 | | | |
| 11 | 103.49980 | 2.500 | 1.84666 | 23.80 | 0.62155 |
| 12 | 78.30285 | 12.975 | 1.43700 | 95.10 | 0.53364 |
| 13 | −945.64008 | 0.120 | | | |
| *14 | 78.80183 | 9.269 | 1.53775 | 74.70 | 0.53936 |
| 15 | 404.64010 | DD[15] | | | |
| 16 | 84.74415 | 7.007 | 1.71736 | 29.52 | 0.60483 |
| 17 | −105.29570 | 0.910 | 1.43700 | 95.10 | 0.53364 |
| 18 | 64.21500 | 4.216 | | | |
| 19 | −696.01274 | 0.810 | 1.80400 | 46.53 | 0.55775 |
| 20 | 37.26187 | 3.820 | 1.80518 | 25.46 | 0.61572 |
| 21 | 73.04376 | 5.685 | | | |
| 22 | −56.97749 | 1.000 | 1.90043 | 37.37 | 0.57668 |
| 23 | 191.39800 | DD[23] | | | |
| 24 | 219.72433 | 3.895 | 1.84850 | 43.79 | 0.56197 |
| 25 | −133.61317 | 0.120 | | | |
| 26 | 314.29080 | 4.197 | 1.53775 | 74.70 | 0.53936 |
| 27 | −100.17207 | 1.310 | 1.84661 | 23.88 | 0.62072 |
| 28 | −450.21790 | DD[28] | | | |

TABLE 1B

Example 1

| Sn | R | D | Nd | νd | θgF |
|---|---|---|---|---|---|
| 29(St) | ∞ | 1.264 | | | |
| 30 | 101.75400 | 3.474 | 1.56883 | 56.04 | 0.54853 |
| 31 | −3223.37330 | 0.120 | | | |
| 32 | 59.24167 | 9.429 | 1.53775 | 74.70 | 0.53936 |
| 33 | −54.26328 | 0.800 | 1.90043 | 37.37 | 0.57668 |
| 34 | 122.12441 | DD[34] | | | |
| 35 | 112.18810 | 1.200 | 1.59282 | 68.62 | 0.54414 |
| 36 | 72.07593 | 7.336 | 1.59270 | 35.31 | 0.59336 |
| 37 | −69.30383 | 0.120 | | | |
| 38 | 43.98928 | 7.187 | 1.53775 | 74.70 | 0.53936 |
| 39 | −681.51453 | 0.700 | 1.87070 | 40.73 | 0.56825 |
| 40 | 39.63685 | 3.045 | | | |
| 41 | 142.09020 | 3.566 | 1.51860 | 69.89 | 0.53184 |
| 42 | −190.64442 | 23.636 | | | |
| 43 | −34.25938 | 0.810 | 1.55032 | 75.50 | 0.54001 |
| 44 | 286.70593 | 3.044 | 1.84661 | 23.88 | 0.62072 |
| 45 | −119.04366 | 1.000 | | | |
| 46 | ∞ | 2.620 | 1.51680 | 64.20 | 0.53430 |
| 47 | ∞ | 39.843 | | | |

TABLE 2

Example 1

| | WIDE | TELE |
|---|---|---|
| Zr | 1.0 | 3.0 |
| f | 80.038 | 241.714 |
| FNo. | 2.76 | 3.36 |
| 2ω(°) | 32.2 | 10.6 |

TABLE 2-continued

Example 1

|  | WIDE | TELE |
|---|---|---|
| IH | 23.15 | 23.15 |
| DD[15] | 2.787 | 59.245 |
| DD[23] | 35.458 | 1.115 |
| DD[28] | 19.852 | 7.867 |
| DD[34] | 17.889 | 7.759 |

TABLE 3

Example 1

| Sn | 3 | 14 |
|---|---|---|
| KA | 1.0000000E+00 | 1.0000000E+00 |
| A4 | 6.2324088E−08 | −8.9421762E−08 |
| A6 | −6.8897292E−12 | 1.9234241E−12 |
| A8 | 8.7272717E−15 | −1.1060557E−14 |
| A10 | −3.7757721E−18 | 4.2371881E−18 |
| A12 | 6.5123320E−22 | −8.9972553E−22 |

Figure 3:
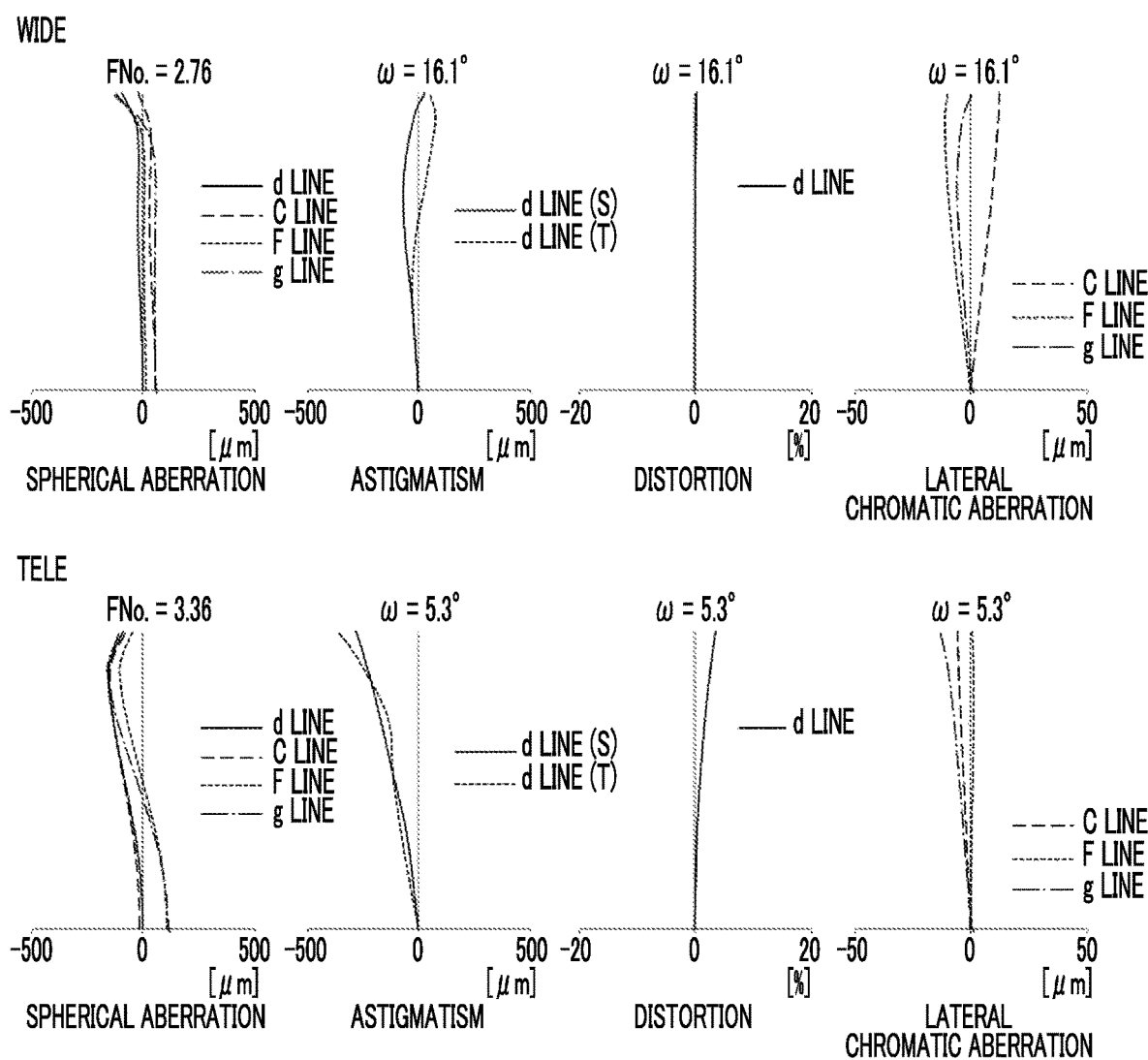
FIG. 3 shows respective aberration diagrams of the zoom lens according to Example 1 of the present disclosure.

FIG. 3 shows an aberration diagram in a state of being focused on an object at infinity through the zoom lens of Example 1. In FIG. 3, in order from a left side, a spherical aberration, an astigmatism, a distortion, and a lateral chromatic aberration are shown. In FIG. 3, an upper part labeled by "WIDE" shows an aberration in a wide-angle end state, and a lower part labeled by "TELE" shows an aberration in a telephoto end state. In the spherical aberration diagram, aberrations at the d line, the C line, the F line, and the g line are indicated by the solid line, the long dashed line, the short dashed line, and the chain line, respectively. In the astigmatism diagram, an aberration in the sagittal direction at the d line is indicated by the solid line, and an aberration in the tangential direction at the d line is indicated by the short dashed line. In the distortion diagram, an aberration at the d line is indicated by the solid line. In the lateral chromatic aberration diagram, aberrations at the C line, the F line, and the g line are respectively indicated by the long dashed line, the short dashed line, and the chain line. In the spherical aberration diagram, FNo. indicates an F number. In other aberration diagrams, ω indicates a half angle of view.

Symbols, meanings, description methods, and illustration methods of the respective data pieces according to Example 1 are the same as those in the following examples unless otherwise noted. Therefore, in the following description, repeated description will be omitted.

Example 2

Figure 4:
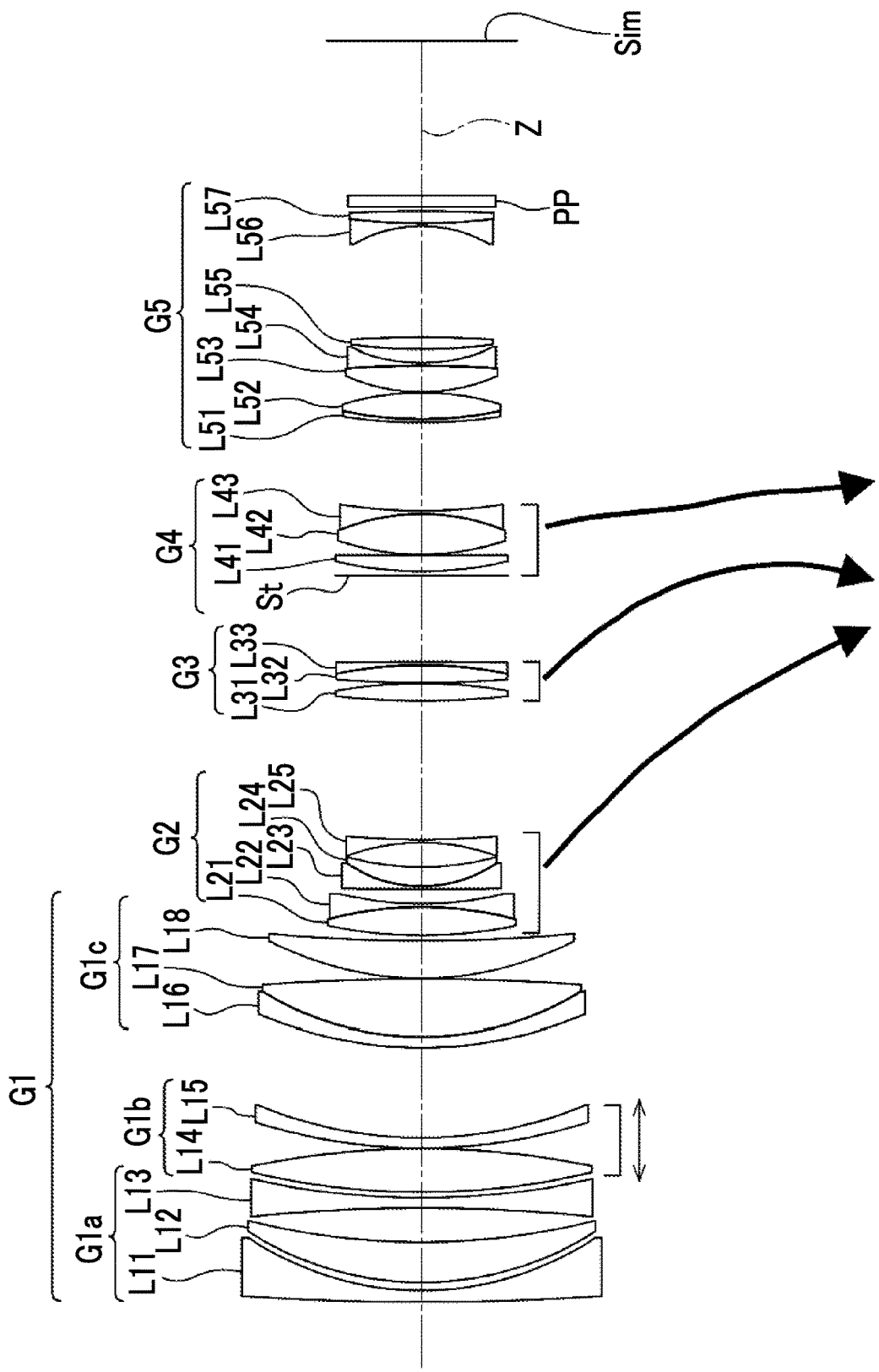
FIG. 4 is a diagram showing a cross-sectional view of a configuration of a zoom lens according to Example 2 of the present disclosure and a movement locus thereof.
Figure 5:
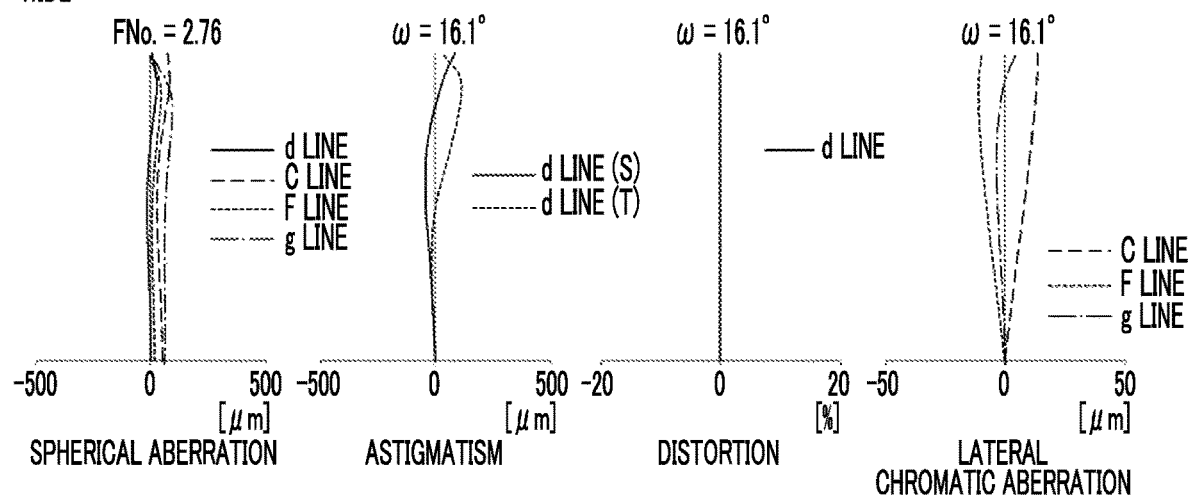
FIG. 5 shows respective aberration diagrams of the zoom lens according to Example 2 of the present disclosure.
Figure 5:
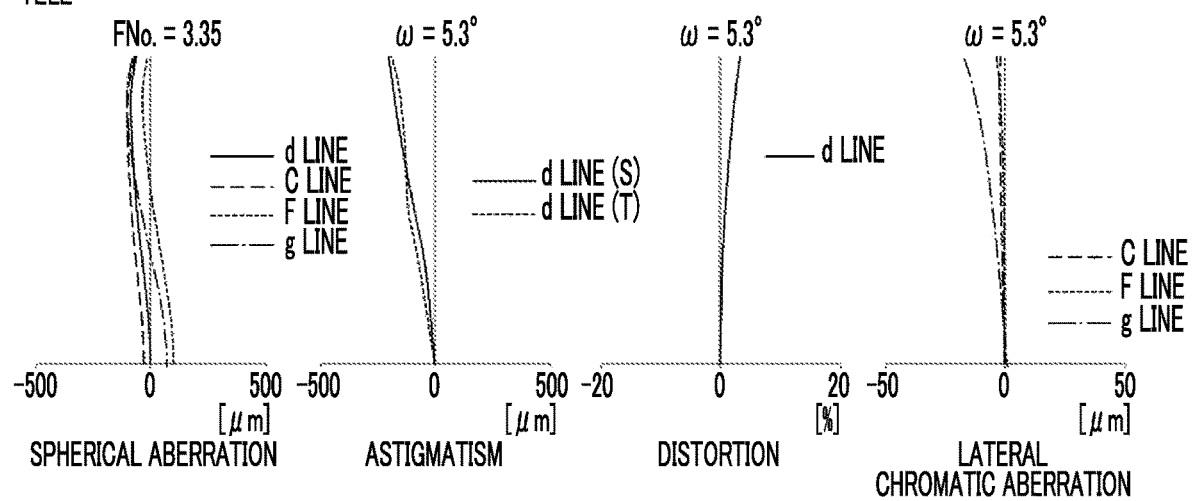

FIG. 4 shows a configuration and a movement locus of the zoom lens of Example 2. The zoom lens of Example 2 has the same configuration as the outline of the zoom lens of Example 1. Regarding the zoom lens of Example 2, Tables 4A and 4B show basic lens data thereof, Table 5 shows specification and variable surface distances thereof, Table 6 shows aspheric coefficients thereof, and FIG. 5 shows aberration diagrams thereof.

TABLE 4A

Example 2

| Sn | R | D | Nd | vd | θgF |
|---|---|---|---|---|---|
| 1 | 635.15805 | 2.900 | 1.48749 | 70.24 | 0.53007 |
| 2 | 76.88429 | 1.927 | | | |
| *3 | 79.87321 | 9.658 | 1.85000 | 27.03 | 0.60935 |
| 4 | 173.99971 | 8.207 | | | |
| 5 | −424.51509 | 2.500 | 1.90265 | 35.77 | 0.58156 |
| 6 | 184.06981 | 1.500 | | | |
| 7 | 181.69597 | 10.492 | 1.53775 | 74.70 | 0.53936 |
| 8 | −202.61114 | 0.120 | | | |
| 9 | 135.41034 | 2.460 | 1.80518 | 25.46 | 0.61572 |
| 10 | 105.19566 | 21.710 | | | |
| 11 | 103.51244 | 2.500 | 1.84666 | 23.80 | 0.62155 |
| 12 | 74.84931 | 13.887 | 1.43700 | 95.10 | 0.53364 |
| 13 | −547.07592 | 0.120 | | | |
| *14 | 79.00358 | 9.160 | 1.53775 | 74.70 | 0.53936 |
| 15 | 411.30161 | DD[15] | | | |
| 16 | 113.43496 | 6.819 | 1.71736 | 29.52 | 0.60483 |
| 17 | −91.18431 | 0.810 | 1.43700 | 95.10 | 0.53364 |
| 18 | 85.48627 | 3.541 | | | |
| 19 | 2230.66576 | 0.710 | 1.80400 | 46.53 | 0.55775 |
| 20 | 32.68367 | 4.613 | 1.80518 | 25.46 | 0.61572 |
| 21 | 69.27881 | 5.885 | | | |
| 22 | −52.73542 | 0.700 | 1.90043 | 37.37 | 0.57668 |
| 23 | 202.51249 | DD[23] | | | |
| 24 | 208.26640 | 4.231 | 1.84850 | 43.79 | 0.56197 |
| 25 | −116.75928 | 0.120 | | | |
| 26 | 265.79196 | 4.225 | 1.53775 | 74.70 | 0.53936 |
| 27 | −105.50772 | 0.800 | 1.84666 | 23.78 | 0.62054 |
| 28 | −1295.05263 | DD[28] | | | |

TABLE 4B

Example 2

| Sn | R | D | Nd | vd | θgF |
|---|---|---|---|---|---|
| 29(St) | ∞ | 1.014 | | | |
| 30 | 91.13147 | 4.004 | 1.56883 | 56.04 | 0.54853 |
| 31 | ∞ | 0.120 | | | |
| 32 | 63.52914 | 9.715 | 1.53775 | 74.70 | 0.53936 |
| 33 | −53.46656 | 0.800 | 1.90043 | 37.37 | 0.57668 |
| 34 | 130.97903 | DD[34] | | | |
| 35 | 126.75636 | 0.800 | 1.59282 | 68.62 | 0.54414 |
| 36 | 91.92086 | 6.327 | 1.59270 | 35.31 | 0.59336 |
| 37 | −67.66397 | 0.223 | | | |
| 38 | 45.62627 | 6.268 | 1.53775 | 74.70 | 0.53936 |
| 39 | −264.19931 | 0.700 | 1.84850 | 43.79 | 0.56197 |
| 40 | 42.03909 | 3.185 | | | |
| 41 | 134.84179 | 2.792 | 1.56883 | 56.04 | 0.54853 |
| 42 | −300.55752 | 26.750 | | | |
| 43 | −33.81179 | 0.710 | 1.43700 | 95.10 | 0.53364 |
| 44 | 145.70721 | 3.111 | 1.84661 | 23.88 | 0.62072 |
| 45 | −359.15320 | 1.000 | | | |
| 46 | ∞ | 2.620 | 1.51633 | 64.14 | 0.53531 |
| 47 | ∞ | 37.368 | | | |

TABLE 5

Example 2

|  | WIDE | TELE |
|---|---|---|
| Zr | 1.0 | 3.0 |
| f | 80.040 | 241.722 |
| FNo. | 2.76 | 3.35 |
| 2ω(°) | 32.2 | 10.6 |
| IH | 23.15 | 23.15 |
| DD[15] | 1.298 | 58.696 |
| DD[23] | 33.578 | 0.991 |
| DD[28] | 20.781 | 6.177 |
| DD[34] | 21.387 | 11.180 |

TABLE 6

| | Example 2 | |
|---|---|---|
| Sn | 3 | 14 |
| KA | 1.0000000E+00 | 1.0000000E+00 |
| A4 | 4.2682415E−08 | −7.8741326E−08 |
| A6 | −2.2542646E−12 | −5.4186755E−12 |
| A8 | 3.1353656E−15 | −2.4116194E−15 |
| A10 | −9.9653872E−19 | 2.5484841E−19 |
| A12 | 1.0844131E−22 | −1.3512486E−22 |

Example 3

Figure 6:
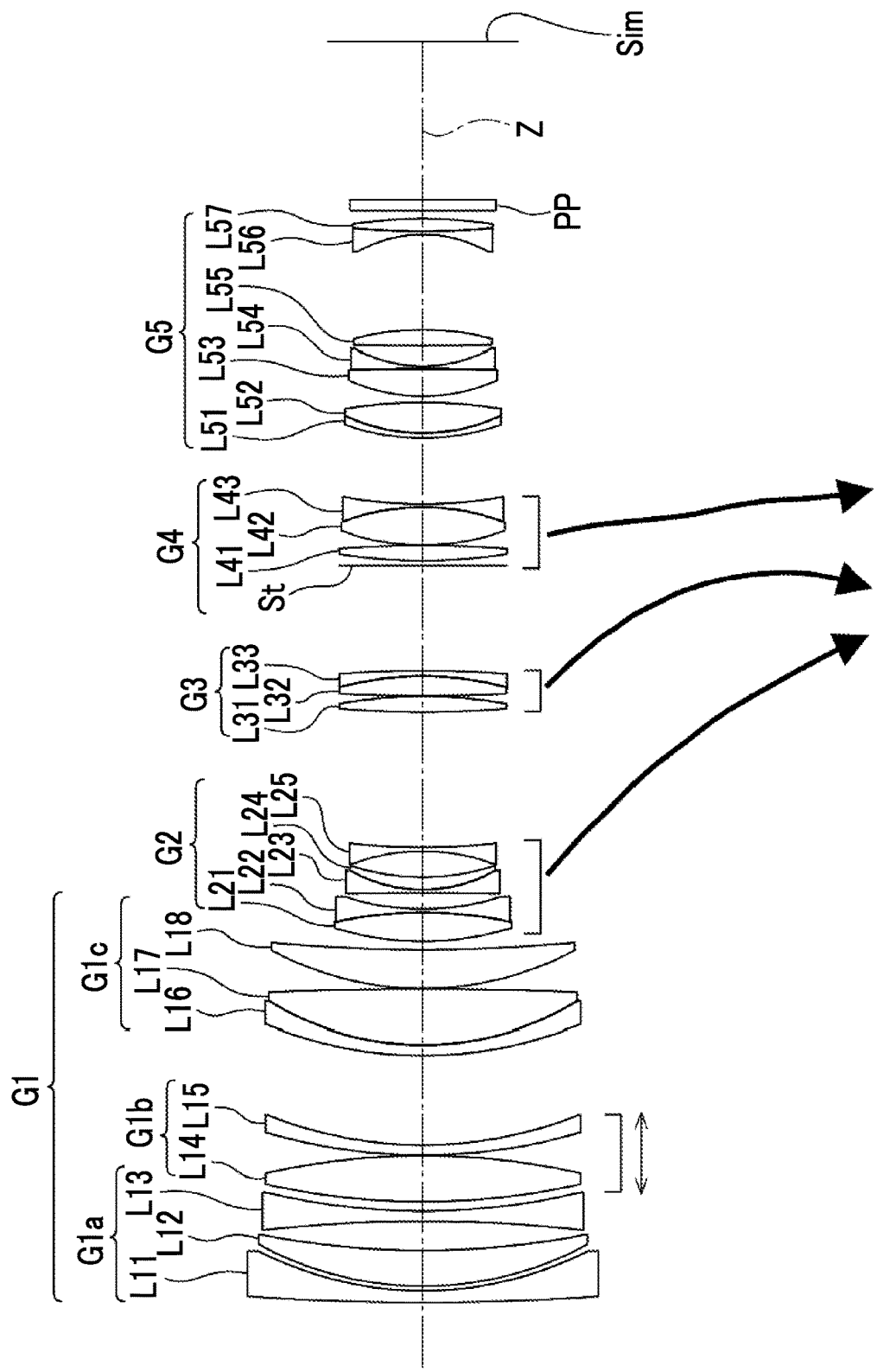
FIG. 6 is a diagram showing a cross-sectional view of a configuration of a zoom lens according to Example 3 of the present disclosure and a movement locus thereof.
Figure 7:
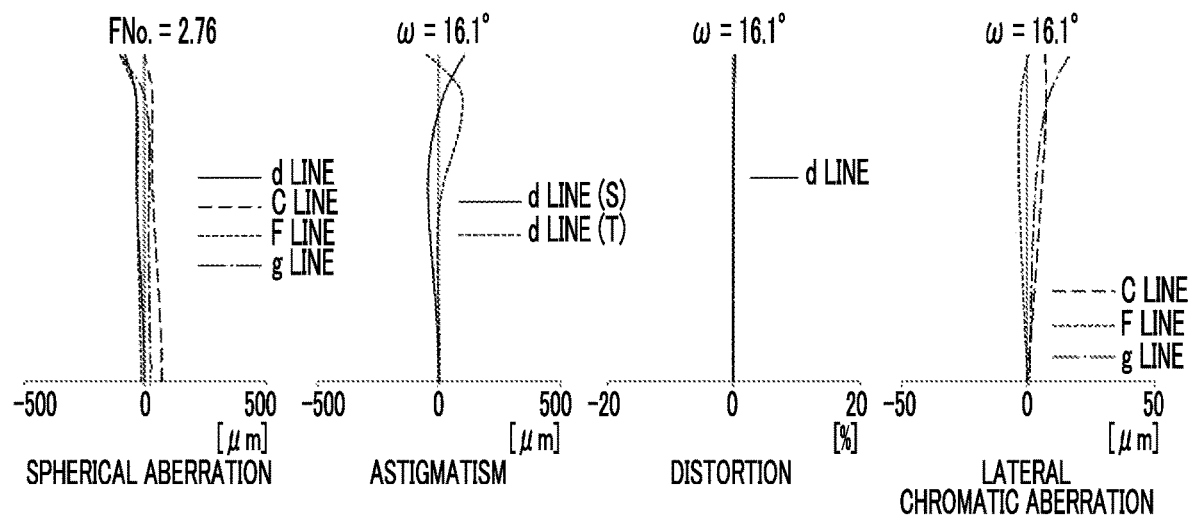
FIG. 7 shows respective aberration diagrams of the zoom lens according to Example 3 of the present disclosure.
Figure 7:
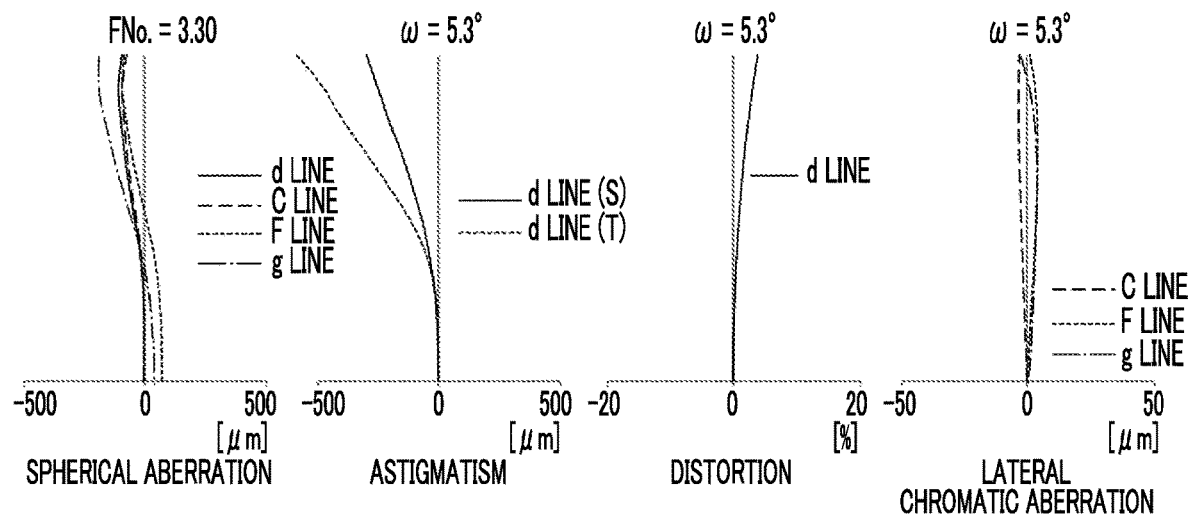

FIG. 6 shows a configuration and a movement locus of the zoom lens of Example 3. The zoom lens of Example 3 has the same configuration as the outline of the zoom lens of Example 1. Regarding the zoom lens of Example 3, Tables 7A and 7B show basic lens data thereof, Table 8 shows specification and variable surface distances thereof, Table 9 shows aspheric coefficients thereof, and FIG. 7 shows aberration diagrams thereof.

TABLE 7A

| | Example 3 | | | | |
|---|---|---|---|---|---|
| Sn | R | D | Nd | νd | θgF |
| 1 | 642.97278 | 2.900 | 1.48749 | 70.24 | 0.53007 |
| 2 | 93.11328 | 1.100 | | | |
| *3 | 89.42162 | 8.618 | 1.84666 | 23.88 | 0.62182 |
| 4 | 212.86324 | 7.091 | | | |
| 5 | −371.53014 | 2.500 | 1.90265 | 35.77 | 0.58156 |
| 6 | 172.97633 | 2.291 | | | |
| 7 | 187.10445 | 11.130 | 1.53775 | 74.70 | 0.53936 |
| 8 | −182.41037 | 0.120 | | | |
| 9 | 142.97249 | 2.460 | 1.80518 | 25.46 | 0.61572 |
| 10 | 108.11170 | 21.798 | | | |
| 11 | 106.79782 | 2.500 | 1.84666 | 23.80 | 0.62155 |
| 12 | 75.61594 | 13.388 | 1.43700 | 95.10 | 0.53364 |
| 13 | −1018.59156 | 0.120 | | | |
| *14 | 80.25963 | 9.438 | 1.53775 | 74.70 | 0.53936 |
| 15 | 402.48254 | DD[15] | | | |
| 16 | 77.09641 | 6.941 | 1.73800 | 32.33 | 0.59005 |
| 17 | −107.59890 | 0.910 | 1.41390 | 100.82 | 0.53373 |
| 18 | 65.73720 | 3.853 | | | |
| 19 | −935.39394 | 0.810 | 1.80400 | 46.53 | 0.55775 |
| 20 | 37.45461 | 3.024 | 1.80518 | 25.46 | 0.61572 |
| 21 | 59.64383 | 6.305 | | | |
| 22 | −51.07866 | 1.000 | 1.81600 | 46.62 | 0.55682 |
| 23 | 192.32408 | DD[23] | | | |
| 24 | 272.85660 | 3.787 | 1.84850 | 43.79 | 0.56197 |
| 25 | −125.15392 | 0.120 | | | |
| 26 | 420.84130 | 4.795 | 1.53775 | 74.70 | 0.53936 |
| 27 | −81.43983 | 1.310 | 1.84661 | 23.88 | 0.62072 |
| 28 | −283.65163 | DD[28] | | | |

TABLE 7B

| | Example 3 | | | | |
|---|---|---|---|---|---|
| Sn | R | D | Nd | νd | θgF |
| 29(St) | ∞ | 1.241 | | | |
| 30 | 133.96017 | 3.627 | 1.56883 | 56.04 | 0.54853 |
| 31 | −327.96392 | 0.120 | | | |
| 32 | 60.05688 | 9.224 | 1.53775 | 74.70 | 0.53936 |
| 33 | −59.02377 | 0.800 | 1.90043 | 37.37 | 0.57668 |
| 34 | 117.14418 | DD[34] | | | |
| 35 | 60.86232 | 1.200 | 1.59349 | 67.00 | 0.53667 |
| 36 | 47.48298 | 7.375 | 1.59270 | 35.31 | 0.59336 |
| 37 | −124.74716 | 1.556 | | | |
| 38 | 47.02490 | 6.555 | 1.53775 | 74.70 | 0.53936 |

TABLE 7B-continued

| | Example 3 | | | | |
|---|---|---|---|---|---|
| Sn | R | D | Nd | νd | θgF |
| 39 | −790.46716 | 0.700 | 1.87070 | 40.73 | 0.56825 |
| 40 | 37.10259 | 4.744 | | | |
| 41 | 622.15676 | 3.905 | 1.51860 | 69.89 | 0.53184 |
| 42 | −67.80440 | 23.148 | | | |
| 43 | −34.20544 | 0.810 | 1.55032 | 75.50 | 0.54001 |
| 44 | 198.50236 | 3.013 | 1.84661 | 23.88 | 0.62072 |
| 45 | −125.87949 | 2.000 | | | |
| 46 | ∞ | 2.620 | 1.51680 | 64.20 | 0.53430 |
| 47 | ∞ | 38.561 | | | |

TABLE 8

| | Example 3 | |
|---|---|---|
| | WIDE | TELE |
| Zr | 1.0 | 3.0 |
| f | 81.027 | 244.702 |
| FNo. | 2.76 | 3.30 |
| 2ω(°) | 32.2 | 10.6 |
| IH | 23.15 | 23.15 |
| DD[15] | 2.041 | 62.993 |
| DD[23] | 32.862 | 0.994 |
| DD[28] | 25.563 | 6.072 |
| DD[34] | 16.013 | 6.420 |

TABLE 9

| | Example 3 | |
|---|---|---|
| Sn | 3 | 14 |
| KA | 1.0000000E+00 | 1.0000000E+00 |
| A4 | 4.3978809E−08 | −7.6450943E−08 |
| A6 | 4.9176282E−12 | −9.4030701E−12 |
| A8 | −4.2033477E−15 | −8.2856022E−16 |
| A10 | 2.4438428E−18 | −1.1581302E−19 |
| A12 | −5.3226393E−22 | −1.4886920E−22 |

Example 4

Figure 8:
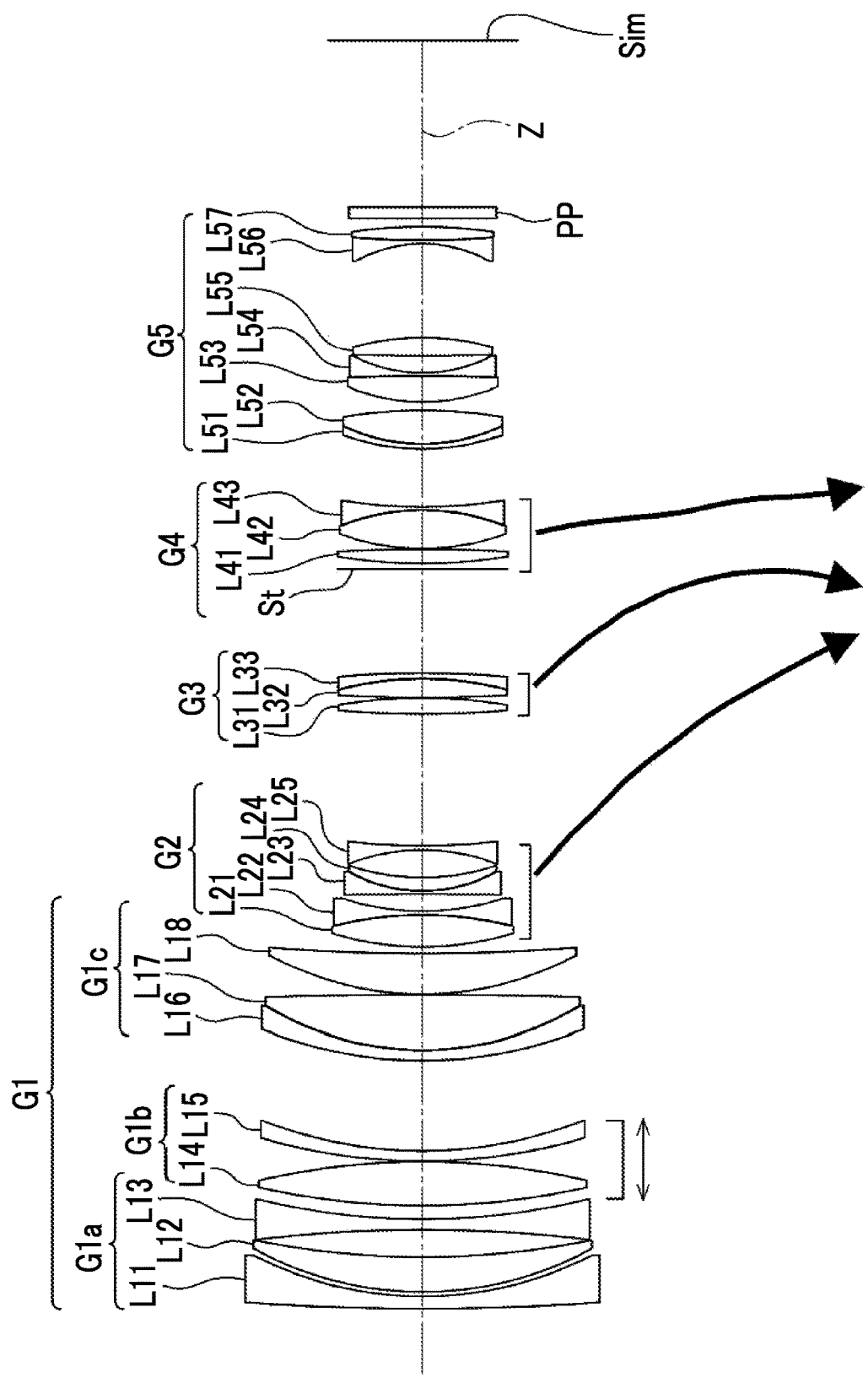
FIG. 8 is a diagram showing a cross-sectional view of a configuration of a zoom lens according to Example 4 of the present disclosure and a movement locus thereof.
Figure 9:
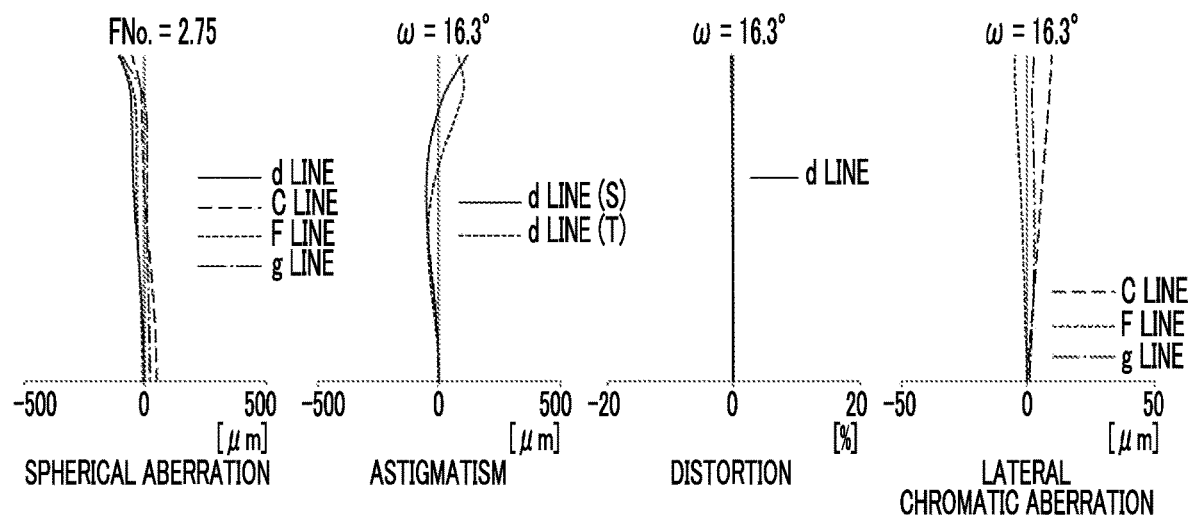
FIG. 9 shows respective aberration diagrams of the zoom lens according to Example 4 of the present disclosure.
Figure 9:
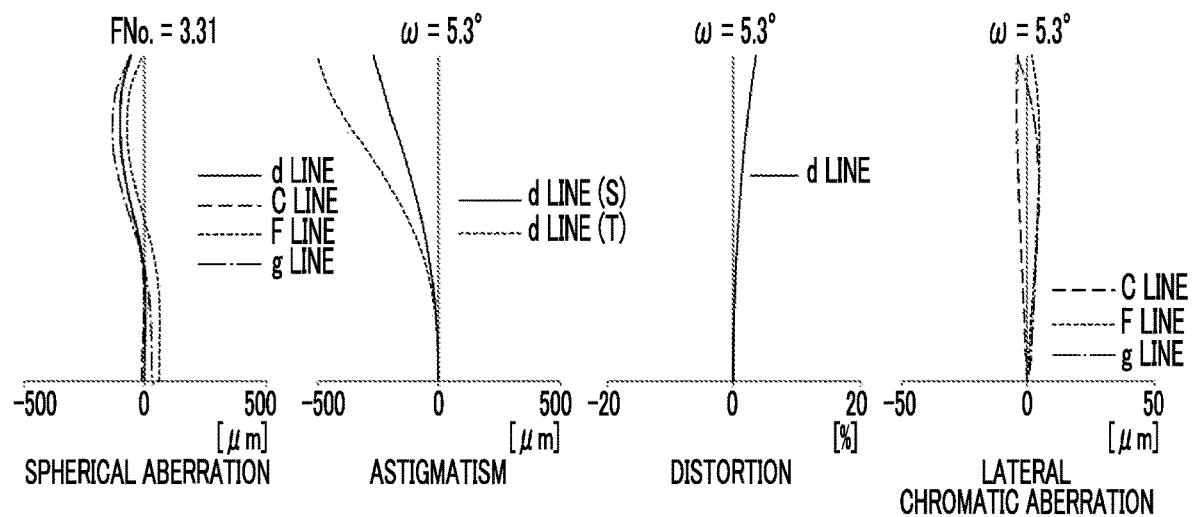

FIG. 8 shows a configuration and a movement locus of the zoom lens of Example 4. The zoom lens of Example 4 has the same configuration as the outline of the zoom lens of Example 1. Regarding the zoom lens of Example 4, Tables 10A and 10B show basic lens data thereof, Table 11 shows specification and variable surface distances thereof, Table 12 shows aspheric coefficients thereof, and FIG. 9 shows aberration diagrams thereof.

TABLE 10A

| | Example 4 | | | | |
|---|---|---|---|---|---|
| Sn | R | D | Nd | νd | θgF |
| 1 | 649.99488 | 2.900 | 1.48749 | 70.24 | 0.53007 |
| 2 | 93.22164 | 1.101 | | | |
| *3 | 90.29764 | 8.359 | 1.84666 | 23.88 | 0.62182 |
| 4 | 218.54936 | 6.549 | | | |
| 5 | −350.14459 | 2.500 | 1.90265 | 35.77 | 0.58156 |
| 6 | 173.74632 | 3.299 | | | |
| 7 | 191.08646 | 10.493 | 1.53775 | 74.70 | 0.53936 |
| 8 | −183.48858 | 0.120 | | | |
| 9 | 145.56773 | 2.460 | 1.80518 | 25.46 | 0.61572 |
| 10 | 110.93434 | 21.737 | | | |
| 11 | 109.30382 | 2.500 | 1.84666 | 23.80 | 0.62155 |

TABLE 10A-continued

Example 4

| Sn | R | D | Nd | vd | θgF |
|---|---|---|---|---|---|
| 12 | 76.69036 | 13.116 | 1.43700 | 95.10 | 0.53364 |
| 13 | −1270.71582 | 0.120 | | | |
| *14 | 79.71062 | 9.784 | 1.53775 | 74.70 | 0.53936 |
| 15 | 519.34539 | DD[15] | | | |
| 16 | 77.67278 | 7.650 | 1.74950 | 35.33 | 0.58189 |
| 17 | −93.00427 | 0.910 | 1.49700 | 81.54 | 0.53748 |
| 18 | 64.20065 | 4.041 | | | |
| 19 | −1624.45869 | 0.810 | 1.72916 | 54.68 | 0.54451 |
| 20 | 37.87836 | 3.239 | 1.75211 | 25.05 | 0.61924 |
| 21 | 58.71926 | 6.636 | | | |
| 22 | −50.05408 | 1.000 | 1.81600 | 46.62 | 0.55682 |
| 23 | 179.37103 | DD[23] | | | |
| 24 | 273.09662 | 3.787 | 1.84850 | 43.79 | 0.56197 |
| 25 | −126.10415 | 0.120 | | | |
| 26 | 420.89807 | 4.481 | 1.53775 | 74.70 | 0.53936 |
| 27 | −83.74654 | 1.310 | 1.84661 | 23.88 | 0.62072 |
| 28 | −263.60224 | DD[28] | | | |

TABLE 10B

Example 4

| Sn | R | D | Nd | vd | θgF |
|---|---|---|---|---|---|
| 29(St) | ∞ | 1.314 | | | |
| 30 | 135.56229 | 3.431 | 1.59282 | 68.62 | 0.54414 |
| 31 | −383.52658 | 0.120 | | | |
| 32 | 61.16572 | 9.188 | 1.53775 | 74.70 | 0.53936 |
| 33 | −57.65053 | 0.800 | 1.90043 | 37.37 | 0.57668 |
| 34 | 124.22061 | DD[34] | | | |
| 35 | 59.93140 | 1.200 | 1.59349 | 67.00 | 0.53667 |
| 36 | 47.19850 | 8.015 | 1.59270 | 35.31 | 0.59336 |
| 37 | −124.50526 | 1.997 | | | |
| 38 | 48.17573 | 6.274 | 1.53775 | 74.70 | 0.53936 |
| 39 | −439.41580 | 0.700 | 1.87070 | 40.73 | 0.56825 |
| 40 | 37.26081 | 4.154 | | | |
| 41 | 683.19786 | 4.179 | 1.51860 | 69.89 | 0.53184 |
| 42 | −64.94934 | 22.526 | | | |
| 43 | −34.57507 | 0.810 | 1.55032 | 75.50 | 0.54001 |
| 44 | 192.15057 | 3.324 | 1.84661 | 23.88 | 0.62072 |
| 45 | −120.29170 | 2.000 | | | |
| 46 | ∞ | 2.620 | 1.51680 | 64.20 | 0.53430 |
| 47 | ∞ | 40.105 | | | |

TABLE 11

Example 4

| | WIDE | TELE |
|---|---|---|
| Zr | 1.0 | 3.0 |
| f | 80.026 | 241.679 |
| FNo. | 2.75 | 3.31 |
| 2ω(°) | 32.6 | 10.6 |
| IH | 23.15 | 23.15 |
| DD[15] | 1.550 | 61.664 |
| DD[23] | 31.743 | 1.399 |
| DD[28] | 25.144 | 5.344 |
| DD[34] | 13.940 | 3.970 |

TABLE 12

Example 4

| Sn | 3 | 14 |
|---|---|---|
| KA | 1.0000000E+00 | 1.0000000E+00 |
| A4 | 5.5208061E−08 | −9.4799847E−08 |
| A6 | −1.0072006E−12 | 1.3863543E−12 |

TABLE 12-continued

Example 4

| Sn | 3 | 14 |
|---|---|---|
| A8 | 1.8425175E−15 | −1.1762874E−14 |
| A10 | −3.4323967E−19 | 4.6800143E−18 |
| A12 | −2.2370932E−23 | −9.5196151E−22 |

Example 5

Figure 10:
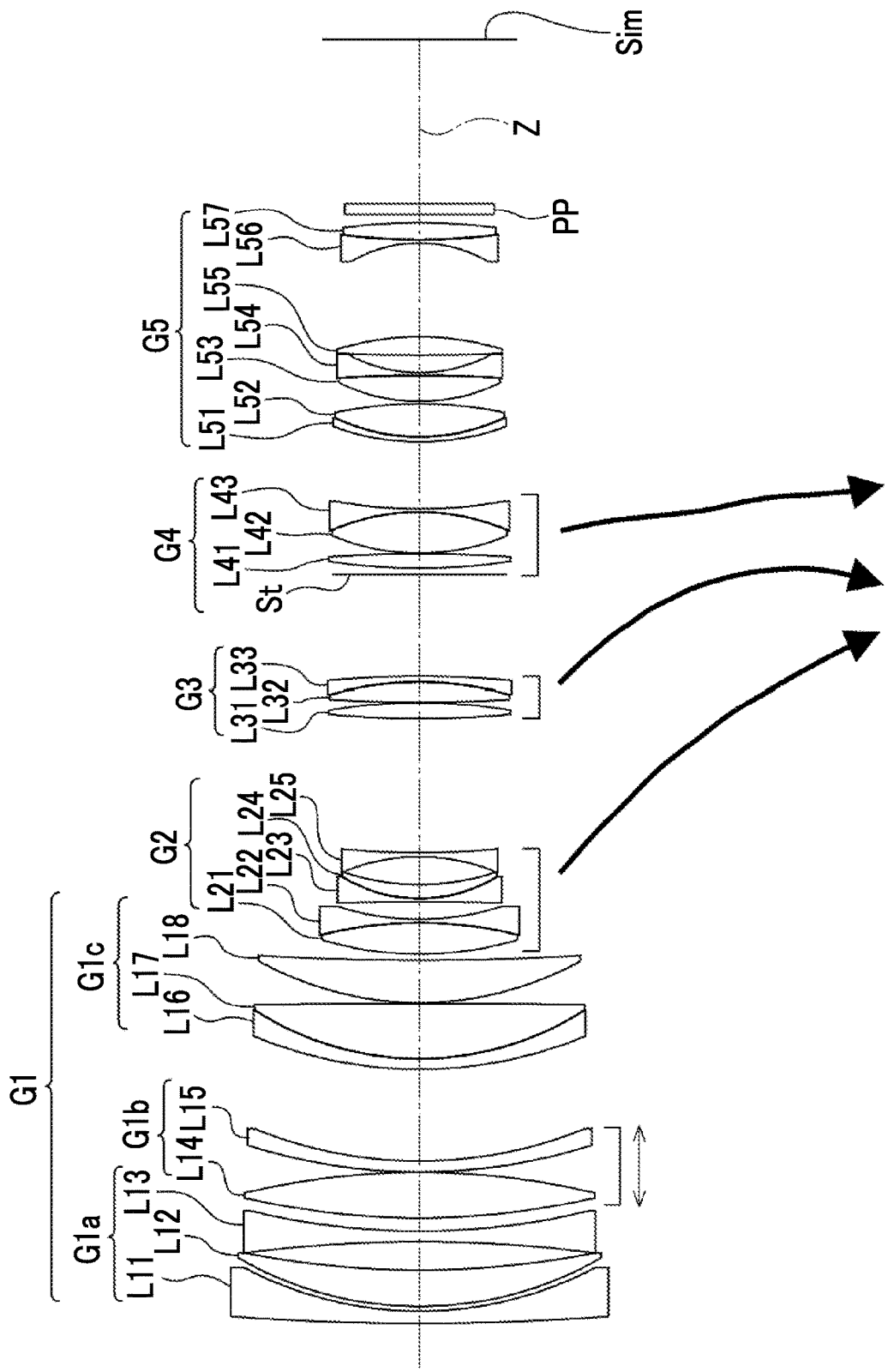
FIG. 10 is a diagram showing a cross-sectional view of a configuration of a zoom lens according to Example 5 of the present disclosure and a movement locus thereof.
Figure 11:
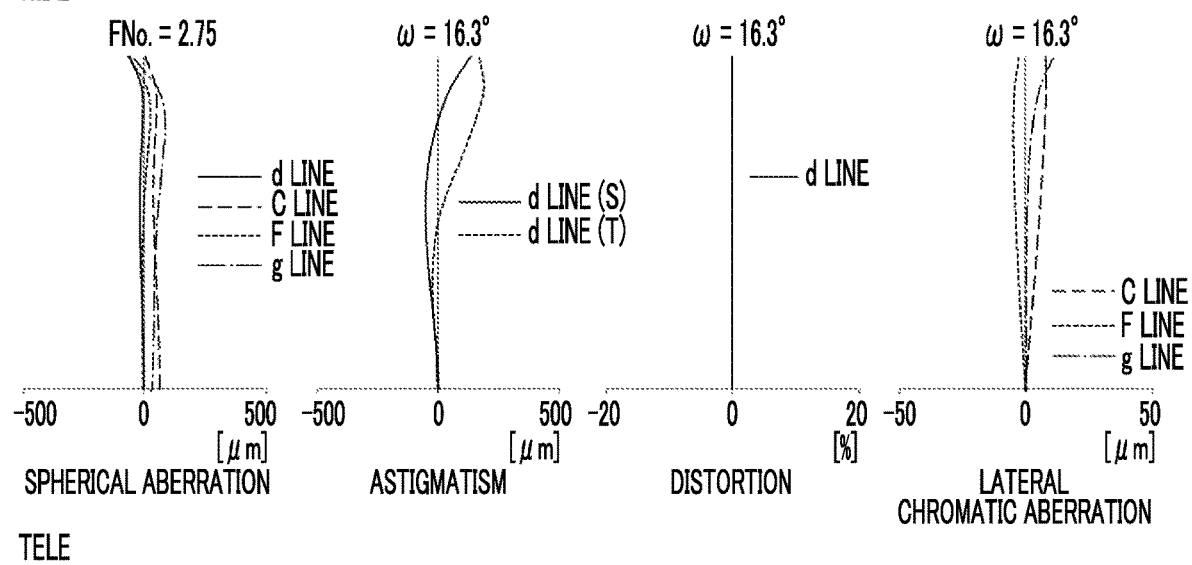
FIG. 11 shows respective aberration diagrams of the zoom lens according to Example 5 of the present disclosure.
Figure 11:
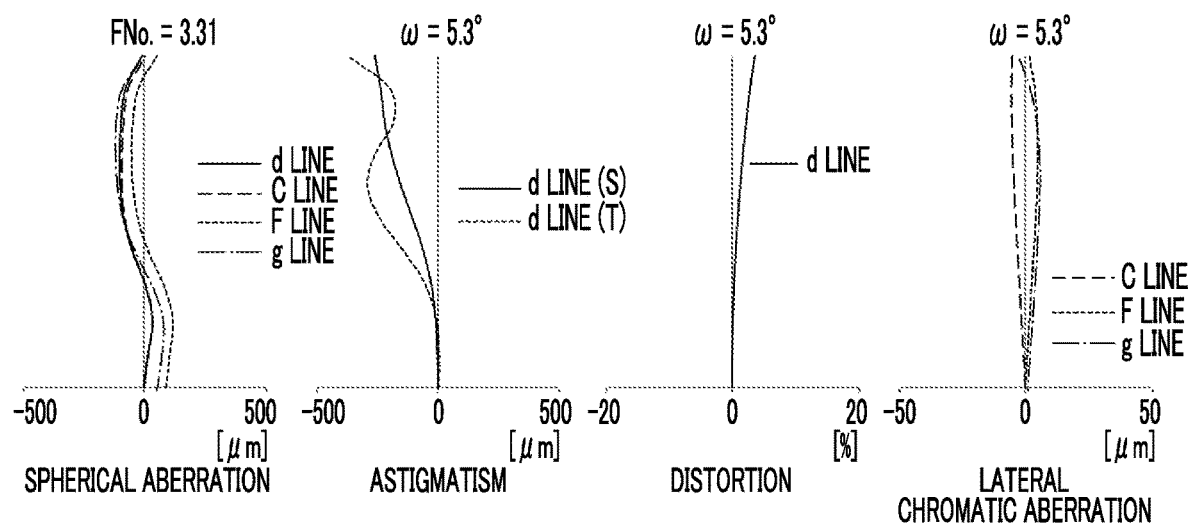

FIG. 10 shows a configuration and a movement locus of the zoom lens of Example 5. The zoom lens of Example 5 has the same configuration as the outline of the zoom lens of Example 1. Regarding the zoom lens of Example 5, Tables 13A and 13B show basic lens data thereof, Table 14 shows specification and variable surface distances thereof, Table 15 shows aspheric coefficients thereof, and FIG. 11 shows aberration diagrams thereof.

TABLE 13A

Example 5

| Sn | R | D | Nd | vd | θgF |
|---|---|---|---|---|---|
| 1 | 660.36339 | 2.900 | 1.48749 | 70.32 | 0.52917 |
| 2 | 93.66151 | 1.100 | | | |
| *3 | 91.56394 | 8.580 | 1.84661 | 23.88 | 0.62072 |
| 4 | 221.88556 | 6.728 | | | |
| 5 | −340.34497 | 2.500 | 1.90265 | 35.77 | 0.58156 |
| 6 | 178.60028 | 3.120 | | | |
| 7 | 187.61047 | 10.910 | 1.53775 | 74.70 | 0.53936 |
| 8 | −187.61047 | 0.120 | | | |
| 9 | 141.82380 | 2.550 | 1.80518 | 25.45 | 0.61571 |
| 10 | 108.90478 | 21.720 | | | |
| 11 | 106.98186 | 2.510 | 1.84666 | 23.80 | 0.62155 |
| 12 | 75.49200 | 13.060 | 1.43700 | 95.10 | 0.53364 |
| 13 | −2545.53987 | 0.120 | | | |
| *14 | 80.24274 | 10.080 | 1.53775 | 74.70 | 0.53936 |
| 15 | 703.43744 | DD[15] | | | |
| 16 | 83.54741 | 7.430 | 1.73800 | 32.33 | 0.59005 |
| 17 | −101.71700 | 0.910 | 1.43700 | 95.10 | 0.53364 |
| 18 | 68.51214 | 4.080 | | | |
| 19 | −908.57342 | 0.810 | 1.80400 | 46.53 | 0.55775 |
| 20 | 36.62600 | 3.320 | 1.80518 | 25.46 | 0.61572 |
| 21 | 60.57187 | 6.520 | | | |
| 22 | −49.62982 | 1.000 | 1.81600 | 46.62 | 0.55682 |
| 23 | 206.09903 | DD[23] | | | |
| 24 | 248.66025 | 3.830 | 1.84850 | 43.79 | 0.56197 |
| 25 | −127.88014 | 0.120 | | | |
| 26 | 403.07188 | 4.650 | 1.53775 | 74.70 | 0.53936 |
| 27 | −82.46300 | 1.310 | 1.84661 | 23.88 | 0.62072 |
| 28 | −260.80547 | DD[28] | | | |

TABLE 13B

Example 5

| Sn | R | D | Nd | vd | θgF |
|---|---|---|---|---|---|
| 29(St) | ∞ | 1.450 | | | |
| 30 | 147.30513 | 3.430 | 1.56883 | 56.04 | 0.54853 |
| 31 | −310.34263 | 0.120 | | | |
| 32 | 55.92500 | 9.680 | 1.53775 | 74.70 | 0.53936 |
| 33 | −55.92500 | 0.800 | 1.90043 | 37.37 | 0.57668 |
| 34 | 115.58583 | DD[34] | | | |
| 35 | 62.52786 | 1.200 | 1.59349 | 67.00 | 0.53667 |
| 36 | 49.37100 | 7.780 | 1.59270 | 35.31 | 0.59336 |
| 37 | −102.58845 | 0.650 | | | |
| 38 | 46.08726 | 6.060 | 1.53775 | 74.70 | 0.53936 |
| 39 | −358.75300 | 0.700 | 1.87070 | 40.73 | 0.56825 |
| 40 | 37.16796 | 4.099 | | | |
| 41 | 492.35132 | 4.350 | 1.51860 | 69.89 | 0.53184 |

TABLE 13B-continued

Example 5

| Sn | R | D | Nd | vd | θgF |
|---|---|---|---|---|---|
| 42 | −70.19266 | 22.170 | | | |
| 43 | 33.61039 | 0.810 | 1.55032 | 75.50 | 0.54001 |
| 44 | 148.62700 | 4.000 | 1.84661 | 23.88 | 0.62072 |
| 45 | −148.62700 | 2.000 | | | |
| 46 | ∞ | 2.620 | 1.51680 | 64.20 | 0.53430 |
| 47 | ∞ | 38.954 | | | |

TABLE 14

Example 5

| | WIDE | TELE |
|---|---|---|
| Zr | 1.0 | 3.0 |
| f | 80.039 | 241.719 |
| FNo. | 2.75 | 3.31 |
| 2ω(°) | 32.6 | 10.6 |
| IH | 23.15 | 23.15 |
| DD[15] | 1.530 | 60.560 |
| DD[23] | 31.710 | 1.234 |
| DD[28] | 24.110 | 5.646 |
| DD[34] | 15.970 | 5.880 |

TABLE 15

Example 5

| Sn | 3 | 14 |
|---|---|---|
| KA | 1.0000000E+00 | 1.0000000E+00 |
| A4 | 6.7279802E−08 | −1.2787733E−07 |
| A6 | −3.7240493E−11 | 1.1940669E−10 |
| A8 | 8.7826157E−14 | −3.7829378E−13 |
| A10 | −1.4858094E−16 | 7.1439023E−16 |
| A12 | 1.7046704E−19 | −8.8408340E−19 |
| A14 | −1.2500084E−22 | 7.0935191E−22 |
| A16 | 5.5791740E−26 | −3.5603139E−25 |
| A18 | −1.3778666E−29 | 1.0156542E−28 |
| A20 | 1.4397885E−33 | −1.2564176E−32 |

Table 16 shows values corresponding to Conditional Expressions (1) to (4) of the zoom lenses of Examples 1 to 5. The values of a focal length, shown in Table 16 are based on the d line.

TABLE 16

| | Expression No. | | | |
|---|---|---|---|---|
| | (1) θn − (0.6483 − 0.001802 × vn) | (2) vn1 − vp1 | (3) θn1 − θp1 | (4) \|f2/ fp1\| |
| Example 1 | 0.0567 | 65.58 | −0.07119 | 0.563 |
| Example 2 | 0.0567 | 65.58 | −0.07119 | 0.514 |
| Example 3 | 0.0671 | 68.49 | −0.05632 | 0.619 |
| Example 4 | 0.0361 | 46.21 | −0.04441 | 0.646 |
| Example 5 | 0.0567 | 62.77 | −0.05641 | 0.580 |

As can be seen from the data described above, the zoom lenses of Examples 1 to 5 have a maximum image height of 23.15 and a large image circle while being downsized, and realize high optical performance with various aberrations, including a lateral chromatic aberration, which are favorably suppressed.

Figure 12:
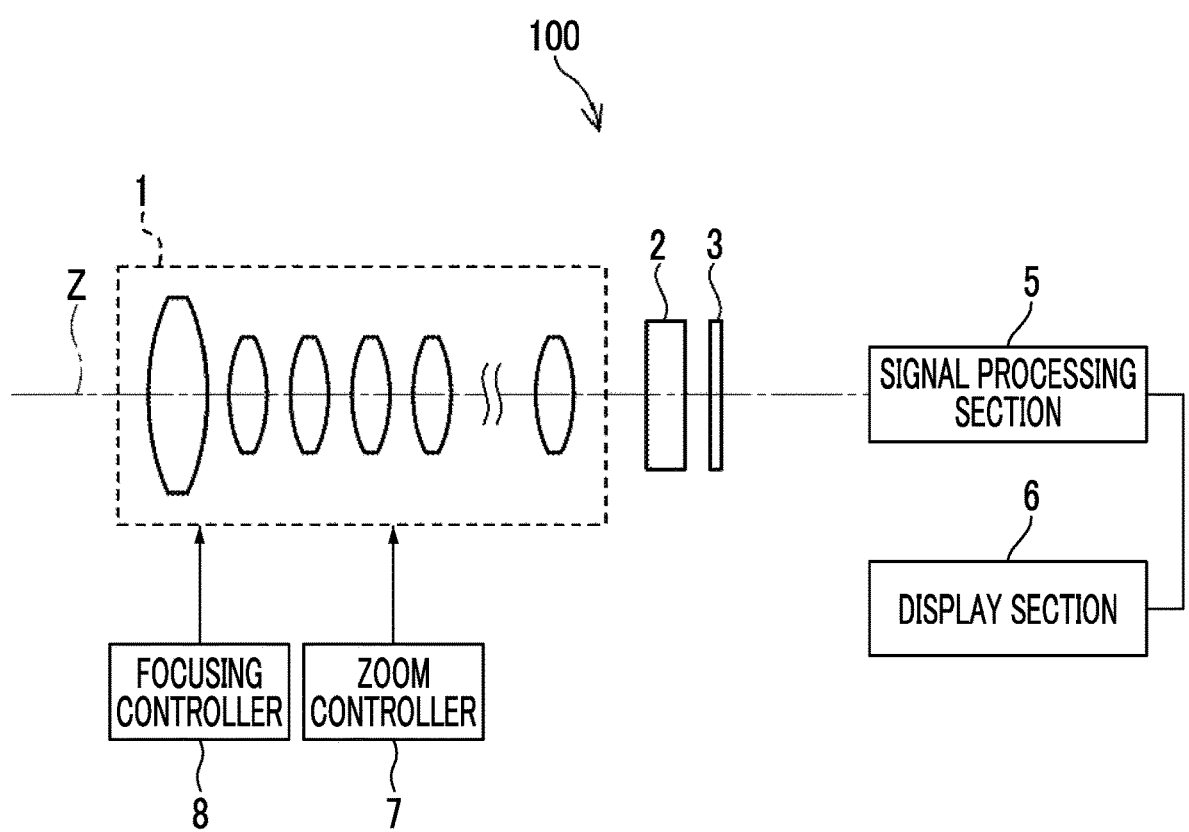
FIG. 12 is a schematic configuration diagram of an imaging apparatus according to an embodiment of the present disclosure.

Next, an imaging apparatus according to an embodiment of the present disclosure will be described. FIG. 12 is a schematic configuration diagram of an imaging apparatus 100 using the zoom lens 1 according to the above-mentioned embodiment of the present disclosure as an example of an imaging apparatus of an embodiment of the present disclosure. Examples of the imaging apparatus 100 include a broadcast camera, a movie camera, a video camera, a surveillance camera, and the like.

The imaging apparatus 100 comprises the zoom lens 1, a filter 2 disposed on an image side of the zoom lens 1, and an imaging element 3 disposed on an image side of the filter 2. Further, FIG. 12 schematically shows a plurality of lenses included in the zoom lens 1.

The imaging element 3 converts an optical image, which is formed through the zoom lens 1, into an electrical signal. For example, it is possible to use a charge coupled device (CCD), complementary metal oxide semiconductor (CMOS), or the like. The imaging element 3 is disposed such that the imaging surface thereof is coplanar with an image plane of the zoom lens 1.

The imaging apparatus 100 also comprises a signal processing section 5 that performs arithmetic processing on an output signal from the imaging element 3, a display section 6 that displays an image formed by the signal processing section 5, a zoom controller 7 that controls zooming of the zoom lens 1, and a focusing controller 8 that controls focusing of the zoom lens 1. Although only one imaging element 3 is shown in FIG. 12, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the radius of curvature, the distance between surfaces, the refractive index, the Abbe number, and the aspheric coefficients of each lens are not limited to the values shown in the numerical examples, and different values may be used therefor.

What is claimed is:

1. A zoom lens consisting of, in order from an object side to an image side:
   a first lens group that has a positive refractive power;
   a second lens group that has a negative refractive power;
   a third lens group that has a positive refractive power;
   a fourth lens group that has a positive refractive power; and
   a fifth lens group that has a positive refractive power,
   wherein during zooming from a wide-angle end to a telephoto end, the first lens group and the fifth lens group remain stationary with respect to an image plane, the second lens group moves to an image side, and the third lens group and the fourth lens group move along an optical axis while changing a distance with each of adjacent lens groups,
   wherein the first lens group consists of, in order from an object side to an image side, a first a lens group that remains stationary with respect to an image plane during focusing and has a negative refractive power, a first b lens group that moves along an optical axis during focusing and has a positive refractive power, and a first c lens group that remains stationary with respect to an image plane during focusing and has a positive refractive power, and
   wherein the second lens group includes one positive lens and one or more negative lenses successively in order from a most object side to an image side.

2. The zoom lens according to claim 1,
wherein among the negative lenses included in the second lens group, for the negative lens having a largest Abbe number based on a d line, assuming that an Abbe number based on a d line is νn and a partial dispersion ratio between a g line and an F line is θn, the following Conditional Expression (1) is satisfied, $$0.01 < \theta n - (0.6483 - 0.001802 \times \nu n) < 0.08 \quad (1).$$

3. The zoom lens according to claim 1,
wherein among the negative lenses included in the second lens group, the negative lens having a largest Abbe number based on a d line is disposed on an image side of the positive lens to be successive to the positive lens.

4. The zoom lens according to claim 1,
wherein the positive lens and the negative lens disposed on an image side of the positive lens to be successive to the positive lens are cemented with each other to form a cemented lens.

5. The zoom lens according to claim 4,
wherein assuming that an Abbe number of the positive lens of the cemented lens based on a d line of is νp1, a partial dispersion ratio between a g line and an F line of the positive lens of the cemented lens is θp1, an Abbe number of the negative lens of the cemented lens based on a d line is νn1, and a partial dispersion ratio between a g line and an F line of the negative lens of the cemented lens is θn1, the following Conditional Expressions (2) and (3) are satisfied, $$35 < \nu n1 - \nu p1 < 70 \quad (2)$$

$$-0.09 < \theta n1 - \theta p1 < -0.03 \quad (3).$$

6. The zoom lens according to claim 1,
wherein assuming that a focal length of the second lens group is f2 and a focal length of the positive lens is fp1, the following Conditional Expression (4) is satisfied, $$0.3 < |f2/fp1| < 0.65 \quad (4).$$

7. The zoom lens according to claim 1,
wherein the second lens group consists of two or more positive lenses and three or more negative lenses.

8. The zoom lens according to claim 2,
wherein the following Conditional Expression (1-1) is satisfied, $$0.02 < \theta n - (0.6483 - 0.001802 \times \nu n) < 0.07 \quad (1-1).$$

9. The zoom lens according to claim 2,
wherein the following Conditional Expression (1-2) is satisfied, $$0.03 < \theta n - (0.6483 - 0.001802 \times \nu n) < 0.07 \quad (1-2).$$

10. The zoom lens according to claim 5,
wherein the following Conditional Expression (2-1) is satisfied, $$45 < \nu n1 - \nu p1 < 70 \quad (2-1).$$

11. The zoom lens according to claim 5,
wherein the following Conditional Expression (3-1) is satisfied, $$-0.08 < \theta n1 - \theta p1 < -0.04 \quad (3-1).$$

12. The zoom lens according to claim 6,
wherein the following Conditional Expression (4-1) is satisfied, $$0.4 < |f2/fp1| < 0.65 \quad (4-1).$$

13. An imaging apparatus comprising the zoom lens according to claim 1.

* * * * *